United States Patent
Browder et al.

(10) Patent No.: US 12,524,727 B1
(45) Date of Patent: Jan. 13, 2026

(54) APPARATUS AND METHOD FOR DISPLAYING AND MODIFYING ASSESSMENT DATA THROUGH A GRAPHICAL USER INTERFACE (GUI)

(71) Applicant: Signet Health Corporation, North Richland Hills, TX (US)

(72) Inventors: Blake Browder, Dallas, TX (US); Joy Figarsky, Little Rock, AR (US)

(73) Assignee: Behavioral Health Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,727

(22) Filed: Nov. 23, 2024

(51) Int. Cl.
| | |
|---|---|
| *G06Q 10/067* | (2023.01) |
| *G06Q 10/0637* | (2023.01) |
| *G06Q 30/018* | (2023.01) |
| *G16H 40/20* | (2018.01) |

(52) U.S. Cl.
CPC ..... *G06Q 10/067* (2013.01); *G06Q 10/06375* (2013.01); *G06Q 30/018* (2013.01); *G16H 40/20* (2018.01)

(58) Field of Classification Search
CPC .... G06Q 10/20; G06Q 10/067; G06Q 30/018; G06Q 10/06375
See application file for complete search history.

(56) References Cited

U.S. PATENT DOCUMENTS

| | | |
|---|---|---|
| 11,062,327 B2 | 7/2021 | Biswas et al. |
| 11,948,114 B2 | 4/2024 | Samples et al. |
| 2005/0028005 A1 | 2/2005 | Carson et al. |
| 2012/0078685 A1* | 3/2012 | Krebs .............. G06Q 10/06375 703/1 |
| 2016/0335731 A1* | 11/2016 | Hall ....................... G06Q 10/10 |
| 2019/0098126 A1* | 3/2019 | Shuttleworth ........ H04M 1/724 |
| 2019/0341140 A1 | 11/2019 | Nachmany et al. |
| 2020/0057824 A1* | 2/2020 | Yeh ......................... G06F 30/13 |

(Continued)

FOREIGN PATENT DOCUMENTS

WO WO-2011106843 A1 * 9/2011 ........... E04B 1/3483

OTHER PUBLICATIONS

Quitaba et al, "Integrate Building Information Modeling (BIM) and Occupant Characteristics Simulator to Assess the Effectiveness of Emergency Requirements", International Journal of Safety and Security Engineering, vol. 14, No. 1, Feb. 2024, pp. 37-46 (2024) (Year: 2024).*

(Continued)

*Primary Examiner* — Andrew Chase Lakhani
(74) *Attorney, Agent, or Firm* — Caldwell Intellectual Property Law

(57) ABSTRACT

An apparatus including a graphical user interface (GUI) for adjusting its display based on image data, the apparatus includes a processor and a memory, wherein the memory contains instructions configuring the processor to receive input data objects including image data of an environment using a machine vision system, and modify a GUI based on the input data objects and the assessment score, wherein modifying the GUI includes automatically generating context-sensitive command inputs that trigger analysis routines within the GUI based on at least a geographic location received from the input data objects, and reconfiguring the GUI to adjust a display hierarchy of interactive elements based on the assessment score.

20 Claims, 8 Drawing Sheets

(56) References Cited

U.S. PATENT DOCUMENTS

| | | | | |
|---|---|---|---|---|
| 2020/0126092 | A1* | 4/2020 | Glaser | G06K 7/1417 |
| 2020/0184556 | A1* | 6/2020 | Cella | G06F 18/241 |
| 2021/0011443 | A1* | 1/2021 | Mcnamara | F24F 11/72 |
| 2021/0192639 | A1* | 6/2021 | Dalal | G06N 3/045 |
| 2021/0381861 | A1* | 12/2021 | Brown | G05D 22/02 |
| 2021/0390812 | A1* | 12/2021 | Chaurasia | G07C 9/20 |
| 2022/0019716 | A1* | 1/2022 | Kiarashinejad | G06N 3/045 |
| 2022/0227536 | A1* | 7/2022 | Kainz | B65D 25/14 |
| 2022/0359048 | A1 | 11/2022 | Patil et al. | |
| 2023/0401591 | A1 | 12/2023 | Janani et al. | |
| 2024/0169193 | A1* | 5/2024 | Bews | G06F 30/13 |

OTHER PUBLICATIONS

Smith et al, "Rapid Prototyping a Virtual Fire Drill Environment using Computer Game Technology", Fire Safety Journal, vol. 44, Issue 4, May 2009, pp. 559-569, doi: 10.1016 (2009) (Year: 2009).*

Streamline Healthcare Compliance With ZetaSafe Zestasafe website https://try.zetasafe.com/healthcare-compliance/?utm_term=hospital%20compliance&utm_campaign=healthcare&utm_source=google&utm_medium=ppc&gad_source=1&gclid=EAlalQobChMIspy-ivzpiQMVX21HAR1VdCb4EAAYASAAEglYw_D_BWE.

Behavioral Health Nash Healthcare Conmsulting website https://nashhealthcareconsulting.com/behavioral-health?gad_source=1&gclid=EAlalQobChMIspy-ivzpiQMVX21HAR1VdCb4EAAYAiAAEgl2zfD_BWE.

Behavioral Health Management: Improving Psych Operations with a Mock Survey Horizon health website https://horizonhealth.com/behavioral-health-management-improving-psych-operations-with-a-mock-survey/.

Mock Survey Services Courtemanche & associates website https://www.courtemanche-assocs.com/services/survey-readiness/survey-support/mock-survey.

* cited by examiner

APPARATUS AND METHOD FOR DISPLAYING AND MODIFYING ASSESSMENT DATA THROUGH A GRAPHICAL USER INTERFACE (GUI)

FIELD OF THE INVENTION

The present invention generally relates to the field of graphical user interfaces. In particular, the present invention is directed to an apparatus and method for displaying and modifying assessment data through a graphical user interface (GUI).

BACKGROUND

There is a technical problem related to assessing and improving a facility's operational readiness in real-time, particularly in identifying and prioritizing compliance gaps while providing actionable insights through an intuitive graphical user interface (GUI). There is a need for a system that can continuously assess compliance using machine learning models and advanced algorithms to automatically adjust the GUI, prioritize the display of critical data, and offer customized coaching or recommendations.

SUMMARY OF THE DISCLOSURE

In an aspect, an apparatus including a graphical user interface (GUI) for displaying and modifying assessment data, the apparatus including at least a processor and a memory configuring the at least a processor to receive input data objects, generate, through an assessment module, simulated assessment data sets, generate an assessment score of the input data as a function of a machine-learning algorithm, and modify a GUI based on the input data objects and the assessment score, wherein modifying the GUI includes automatically generating context-sensitive command inputs that trigger analysis routines within the GUI based on at least a geographic location received from the input data objects, and reconfiguring the GUI to adjust a display hierarchy of interactive elements based on the assessment score.

In another aspect, a method for displaying and modifying assessment data through a graphical user interface (GUI), the method including receiving, by a computing device, input data objects, generating, by the computing device, through an assessment module, simulated assessment data sets, generate an assessment score of the input data as a function of a machine-learning algorithm and modifying, by the computing device, a GUI based on the input data objects and the assessment score, wherein modifying the GUI includes automatically generating context-sensitive command inputs that trigger analysis routines within the GUI based on at least a geographic location received from the input data objects, and reconfiguring the GUI to adjust a display hierarchy of interactive elements based on the assessment score.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for displaying and modifying data elements in response to assessment data.

Apparatuses and methods described herein may be designed to efficiently manage and monitor safety compliance within facilities, such as behavioral health environments. Apparatuses and methods may process various types of input data, such as building plans, material specifications, and regulatory updates, to ensure that all aspects of the facility meet relevant safety standards and regulations. Terms relate to "compliance," "non-compliance" and "regulatory," may to adherence to critical safety protocols, including fire safety, material durability, patient security, and other health and safety regulations. Apparatuses and methods described herein may automatically assess whether areas of the facility are compliant, flagging any non-compliant sections for review. Furthermore, detailed safety analysis reports may be generated, which may include interactive visualizations such as heatmaps that allow users to easily identify compliant and non-compliant areas in real-time. Users can also interact with the system to simulate hypothetical changes to the facility, such as material upgrades or layout adjustments, to see how these changes would impact compliance. This system can be used to ensure that facilities remain in continuous compliance with evolving safety standards, providing managers with the tools to make informed, proactive decisions to maintain a safe and compliant environment.

Exemplary embodiments illustrating aspects of the present disclosure are described below in the context of several specific examples.

Figure 1A:
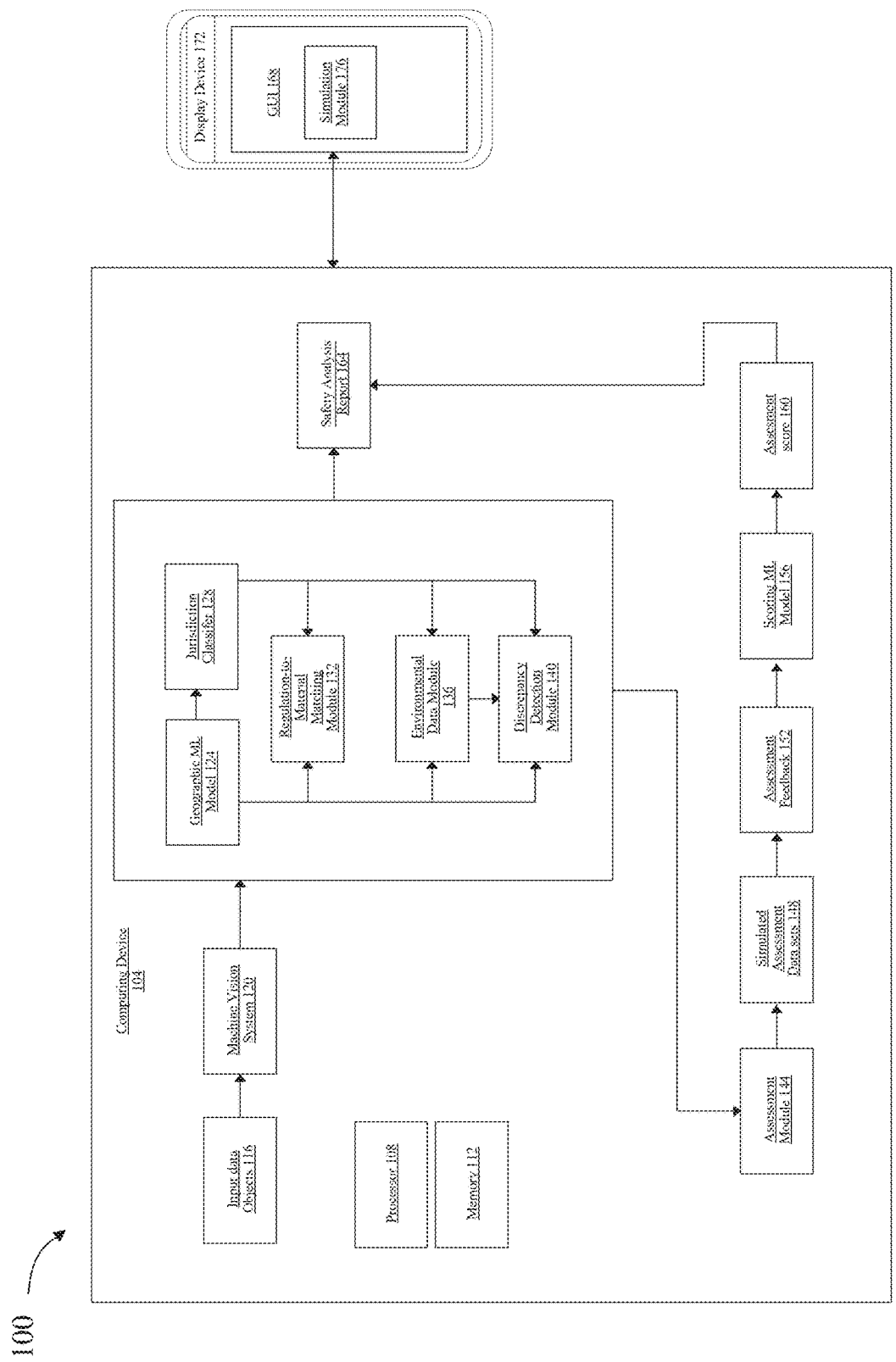
FIG. 1A is an exemplary embodiment of an apparatus including a graphical user interface (GUI) for displaying and modifying assessment data.

Referring now to FIG. 1A, an exemplary embodiment of an apparatus 100 comprising a graphical user interface (GUI) for displaying and modifying assessment data is illustrated. Assessment data broadly refers to the collection of structured and unstructured information used to evaluate a facility's operational capabilities, safety standards, and regulatory compliance. This data may include various aspects of a facility's readiness, including environmental factors (e.g., building plans, material specifications), performance metrics (e.g., equipment functionality, staff training levels), and safety indicators (e.g., fire safety compliance, emergency preparedness). Additionally, assessment data may include user inputs, such as feedback from facility staff or inspectors, as well as real-time operational data reflecting the facility's ability to meet regulatory standards and ensure a safe, compliant environment. This comprehensive data set serves as the foundation for generating both assessment scores and compliance scores, which are used to evaluate the facility's overall operational readiness and identify areas for improvement.

Still referring to FIG. 1, apparatus 100 includes a computing device 104. Computing device includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1A, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. computing device 104 may be implemented, as a non-limiting example, using a "shared nothing" architecture.

With continued reference to FIG. 1A, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, processor 108 is configured to receive input data objects 116.

Input data objects," as used herein, are individual units of information. Input data objects 116 may be categorized into two main types: structured and unstructured data. Structured data refers to highly organized, easily searchable data that fits into pre-defined formats like databases, spreadsheets, or tables. Examples include numerical values, alphanumeric codes (e.g., zip codes or regulatory codes), and standardized forms where fields and values are clearly delineated. Unstructured data is more complex and does not fit neatly into these formats. This may include PDFs, images, scanned documents, freeform text, and multimedia content. For instance, processor 108 may gather regulatory mandates from a government PDF file or training content from scanned hospital compliance forms. To handle this diversity, apparatus may include modules such as Optical Character Recognition (OCR) and machine vision technologies to convert unstructured data into usable, structured formats for further analysis.

Still referring to FIG. 1A, in some embodiments, receiving input data objects 116 may include implementing a machine vision system, wherein the input data objects 116 may include image data of an environment using a machine vision system, wherein the image data includes visual inputs. "Image data," as used herein, is digital information that represents visual content. "Visual inputs," as used herein, are raw visual elements of physical objects within an environment. Visual inputs may depict structural elements (e.g., walls, floors, fixtures), materials, or any other visually discernible objects that need to be analyzed for safety, compliance, or operational purposes.

Still referring to FIG. 1A, the machine vision system 120 may capture visual inputs, such as images or video streams, representing real-world objects within a facility, including materials, fixtures, and other environmental components. These visual inputs may be processed by processor 108 to assess compliance with relevant safety and regulatory standards as described further below. For example, the image data may include visual scans of ceiling fixtures, wall materials, or other structural elements, which are analyzed to determine whether they meet fire safety or anti-ligature requirements. The machine vision system 120 may enable apparatus 100 to automatically gather unstructured image data from the facility, and with the help of additional modules, such as Optical Character Recognition (OCR) and pattern recognition technologies, processor 108 may convert this unstructured image data into structured formats for further analysis. These structured formats can then be cross-referenced with the applicable regulatory mandates, allowing the system to perform real-time safety assessments and compliance checks based on the visual data it receives. This capability provides a critical function in ensuring that the physical aspects of the environment are properly analyzed and verified for compliance without the need for manual inspection or data entry.

Still referring to FIG. 1A, in some embodiments, the machine vision system 120 may include at least a camera. A machine vision system 120 may use images from the camera, to make a determination about a scene, space, and/or object. For example, in some cases a machine vision system 120 may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system 120 may use a classifier, such as any classifier described throughout this disclosure.

Still referring to FIG. 1A, processor 108 is configured to process the image data within the machine vision system 120 to extract and classify components of the visual inputs, ultimately generating structured environmental data that can be used for compliance and safety assessments. The process begins when processor 108 receives the image data, which may include still images or video frames captured from the facility. This image data may include visual information about key environmental components, such as building materials, fixtures, and structural elements, which may be analyzed for compliance with regulatory standards. Processor 108 may first apply a feature extraction algorithm, such as a convolutional neural network (CNN), which may be pre-trained on a dataset comprising labeled images of various materials, fixtures, and safety-related components. This CNN may designed to identify and isolate specific visual features/inputs within the image data, such as the texture of walls, the shape of ceiling fixtures, or the presence of anti-ligature designs. The training data for this model may include a plurality of annotated images that cover different types of building materials, fire-rated components, and safety fixtures commonly found in health related environments.

Still referring to FIG. 1A, the CNN may apply convolutional filters/layers to detect low-level visual features such as edges, textures, and basic shapes within the image data. These layers act as feature detectors, identifying fundamental patterns like surface texture variations or material boundaries. As the data moves through deeper layers of the network, more complex, high-level structures are recognized. These deeper convolutional layers extract and classify objects such as the specific geometric shape of ceiling fixtures or the presence of anti-ligature safety designs in door handles, enabling the system to distinguish between compliant and non-compliant elements within the facility. For instance, in one processing stage, the CNN may analyze the texture patterns of materials to differentiate between fire-rated and non-fire-rated materials by identifying micro-patterns consistent with fire-resistant coatings or structural materials. Simultaneously, another layer may analyze the curvature or structural features of ceiling fixtures, classifying them based on whether their design meets anti-ligature standards to prevent self-harm in behavioral health environments. Additionally, processor 108 may configure the CNN to handle images from diverse angles and lighting conditions, ensuring robustness across varying environmental factors. The CNN, through its deep learning architecture, may be trained to maintain high accuracy whether the visual data is captured in bright, well-lit environments or in low-light settings commonly encountered in different sections of a facility. This adaptability ensures that the classification of safety-critical fixtures and materials remains reliable, regardless of the visual context in which the image data is obtained. To further enhance the robustness of the model, data augmentation techniques may be applied during the training phase. These techniques may include transformations such as rotations, scaling, color variations, and occlusions of the input images. Data augmentation ensures that the CNN is capable of handling a wide range of image distortions or modifications that could occur in real-world facility environments. For example, the model is trained to accurately classify a safety fixture whether it is partially obscured by other objects, viewed from an unconventional angle, or subject to varying lighting conditions. This data augmentation enables the CNN to generalize effectively, making processor 108 capable of processing diverse and imperfect image inputs with high reliability and precision.

Still referring to FIG. 1A, once the relevant features are extracted, processor 108 may employ a support vector machine (SVM) or a random forest classifier to categorize the visual inputs into predefined classes, such as compliant materials or non-compliant fixtures. This classification model may be trained on a comprehensive dataset containing historical compliance data, environmental standards, and regulatory outcomes from various facilities. This ensures that the model accurately classifies the extracted components according to their safety and regulatory status. After the classification process, processor 108 may convert the classified visual inputs into structured environmental data. This may include assigning each classified component (e.g., a fire-rated door, anti-ligature fixture) a set of attributes, such as material type, safety rating, and compliance status, and organizing this information in a structured format, such as a database or table. This structured data mya be further analyzed by other system modules, such as the automated discrepancy detection module, which compares the structured environmental data against applicable safety regulations.

Still referring to FIG. 1, in some embodiments, processing the image data may include applying post-processing algorithms to enhance the accuracy of the extracted data. For example, edge detection algorithms or region-based segmentation techniques may be used to precisely delineate the boundaries of fixtures or materials in the image data, improving the system's ability to classify components correctly. Additionally, machine learning models, such as auto-encoders, may be employed by processor 108 to filter out noise and irrelevant data from the visual inputs, thereby ensuring that only relevant components of the image data are processed and structured. "Autoencoders," as user herein, are unsupervised neural networks that are particularly effective at dimensionality reduction and denoising tasks. They consist of two parts: an encoder that compresses the input data into a lower-dimensional representation, and a decoder that reconstructs the original data from the compressed version. The key functionality of autoencoders lies in their ability to retain the most important features of the input data while discarding irrelevant information, such as noise or extraneous visual artifacts. In the context of the machine vision system 120, processor 108 may employ the autoencoder to the raw image data-whether from still images or video frames—to reduce noise and focus on relevant features, such as safety-critical elements like fixtures, materials, and structural components. For instance, when processing image data from a facility's environment, noise may include irrelevant objects, shadows, reflections, or low-quality image segments that do not contribute to safety compliance analysis. The autoencoder, which may be trained on large datasets of facility images, is capable of identifying such noise and excluding it from further analysis. The training data for the autoencoder model may include a wide variety of image data, encompassing both high-quality and noisy images of facility environments. This training data may be annotated to highlight relevant safety elements, such as compliant materials or safety fixtures, allowing the autoencoder to learn the patterns and features that differentiate useful information from irrelevant noise. Through training, the autoencoder becomes proficient at identifying which parts of the image data are critical for compliance analysis and which parts can be ignored or compressed out of the visual input. Once the encoder portion of the autoencoder compresses the visual inputs into a lower-dimensional form, it reduces the complexity of the image data, eliminating noise such as random visual distortions or irrelevant objects in the background. The decoder then reconstructs the remaining essential features into a clearer, cleaner version of the image data, which retains only the elements that are necessary for further classification and structuring.

Still referring to FIG. 1A, in some embodiments, input data objects may be received from external data sources. "External data sources," as used herein, refer to the locations from which the apparatus retrieves these input data objects 116. These may include government websites, industry association databases, hospital portals, or other repositories of regulatory information. The data crawler is responsible for automatically fetching the input data from these sources at regular intervals. The system's processor is programmed to access these external resources via APIs, web scraping techniques, or data feeds, ensuring that the most current information is continuously ingested. The external sources provide critical regulatory data that varies by region, helping the system maintain compliance with the specific rules and standards that apply to different geographic areas.

Still referring to FIG. 1A, input data objects 116 may include geospatial coordinates, which are used to pinpoint the user's location. These coordinates may be obtained from GPS signals, IP address-based geolocation services, or manually entered zip codes. Geospatial data allows the apparatus to cross-reference the user's current location with the corresponding local regulations and training mandates. Processor 108 may integrate this location data with the regulatory information fetched by a data crawler, ensuring that the training modules and GUI are tailored to the user's precise geographical region.

Still referring to FIG. 1A, the input data objects 116 may also include metadata, which refers to information that describes the characteristics of the data itself. For example, metadata may include the creation date of a document, the source of the data, or attributes that describe the format or language of the content. Metadata may help processor 108 to organize and filter data efficiently, allowing the system to categorize documents based on relevance, authenticity, or timeliness. For instance, metadata could be used to prioritize newer regulatory documents over outdated ones or to filter data by jurisdiction to ensure compliance with the correct set of regulations.

Still referring to FIG. 1A, input data objects 116 may include safety and building regulations from various external sources, including federal, state, and local regulatory bodies. These input data objects 116 may be categorized into both structured and unstructured data formats, where structured data may include regulatory codes, numerical compliance standards, and alphanumeric identifiers such as safety regulation IDs or zip codes. For example, structured data may represent a predefined set of safety protocols mandated for hospitals based on their geographic location. In addition, unstructured data may consist of more complex forms of safety regulations, such as government-issued PDFs, scanned documents of building codes, or freeform text describing local regulations. For instance, regulatory mandates regarding material usage or facility layout, provided in a PDF by a state health department, can be processed using Optical Character Recognition (OCR) and machine vision technologies. These modules convert unstructured data into structured formats, such as text fields or tables, that can be further analyzed by the system to identify specific regulations applicable to a hospital or behavioral health unit. Furthermore, geospatial coordinates within input data objects 116, such as the hospital's latitude and longitude, may be cross-referenced with a geographic mapping module to identify regional-specific safety and building regulations, and described further below. Metadata associated with these data objects may also indicate the source or revision date of the regulatory documents, ensuring that the system uses the most up-to-date standards in the safety analysis.

Still referring to FIG. 1A, receiving the input data objects 116 may include implementing a data crawler. A "data crawler," as used herein, is a program designed to automatically navigate and collect data from publicly accessible websites, such as government portals, hospital sites, and industry association databases. The data crawler operates by scanning these websites, identifying relevant content related to regulatory requirements, and systematically extracting this information. The crawler may be configured to handle both structured data (such as HTML tables or JSON feeds) and unstructured data (such as PDFs, images, and text blocks embedded within web pages). The data crawler data may work at scheduled intervals, continuously scanning these sources to ensure that the most up-to-date regulatory data is collected. Processor 108 may configure the data crawler to initiate a web request to a target website, accessing pages that contain training regulations, compliance mandates, or policy changes relevant to specific geographic areas. Once the crawler identifies relevant sections of the site, it downloads the data for further processing. If the data is in a structured format, such as an HTML table, the crawler extracts the relevant fields directly. For unstructured formats like PDFs or images, the data is passed to apparatus 100's OCR module for further processing. The crawler may also gather metadata (e.g., publication date, source, and jurisdiction) to ensure the data's relevance and accuracy. An OCR module may include any OCR module as described throughout this disclosure. The OCR module may analyze a document, using pattern recognition techniques to identify text embedded within an image. The OCR module may use machine learning algorithms and neural networks to enhance accuracy, especially when dealing with complex fonts, poor image quality, or variations in document formatting. For example, a PDF of a government-issued regulatory update may contain dense legal language, tables, or multi-column layouts, all of which the OCR system must accurately process to ensure no critical information is missed.

Still referring to FIG. 1A, the data crawler may be configured to search for safety, compliance, and regulation data across multiple levels of regulatory bodies, including federal, state, and local sources. It may navigate to government websites and databases that publish safety protocols and building regulations applicable to hospitals or behavioral health units. For example, it can extract structured data from federal databases containing national safety standards, such as fire safety or building code regulations, while simultaneously scanning state or local government websites for additional location-specific mandates. These regulations could include requirements related to the construction materials, building design, patient safety measures, or facility maintenance standards. When the data crawler encounters unstructured formats, such as PDFs of regulatory updates or scanned building codes, the extracted data may be processed by the apparatuses' OCR module for further analysis. This may be useful for extracting detailed safety and building regulations from scanned documents, such as local building permit requirements, facility design standards, or material compliance regulations. For example, if a local government publishes updated safety guidelines in a PDF format, the data crawler may download this document, and the OCR module may use machine learning algorithms and pattern recognition techniques to extract critical regulatory details, ensuring that both the structured and unstructured safety data are accurately captured and processed. Additionally, the data crawler may gather metadata such as the publication date, source of the regulations, and the geographic jurisdiction of the data, ensuring that the safety and building regulations are both accurate and relevant to the specific hospital or behavioral health facility being analyzed.

Still referring to FIG. 1A, the OCR module may perform image pre-processing, which involves enhancing the clarity and structure of the scanned document to improve the recognition process. This includes adjusting brightness, contrast, and removing any background noise or distortions that may hinder accurate text recognition. Next, the OCR system may break the document down into segments, such as blocks of text, images, tables, and headings. For text regions, the system may use character recognition algorithms to identify each letter, number, or symbol, converting it into a digital representation. The conversion process does not stop at basic text extraction; apparatus 100 via the OCR module may also interpret the structure of the document, ensuring that the layout is preserved and meaningful data, such as headings, bullet points, tables, or annotations, is correctly identified. For example, a table listing regional compliance deadlines must be recognized as a table and converted accordingly into a structured format, where each cell and its corresponding data are properly indexed. Once the text is extracted and converted, the OCR module may generate a machine-readable format, such as a structured database entry, a JSON or XML file, or a text-based document. This enables apparatus 100 to further process the data for various purposes, including mapping it to location-specific regulations, assigning training modules, or displaying it in the graphical user interface (GUI). The OCR module may also extract metadata from a document, such as the publication date, the source (e.g., the issuing regulatory body), and any geographic identifiers embedded in the content (e.g., region-specific regulations. Furthermore, the OCR module may be integrated with machine vision technology. The machine vision system 120 may identify these non-textual elements, classifying them for further use or storing them as metadata to ensure that all aspects of the original document are preserved.

Still referring to FIG. 1A, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1A, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1A, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1A, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1A, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1A, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks.

Still referring to FIG. 1A, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1A, receiving input data objects 116 may also include processor 108 implementing Application Programming Interfaces (APIs). APIs provide a direct and efficient way to obtain structured data from trusted third-party databases or platforms. Regulatory bodies and organizations may provide APIs to allow external systems to access their databases in real-time. Processor 108 may be configured to make periodic API requests, pulling regulatory data, training requirements, and policy updates directly into the system. The retrieval process through an API may include sending a request from apparatus 100 to the external API endpoint. This request typically includes parameters, such as the specific geographic location (via geospatial coordinates) or user-specific identifiers (e.g., role or profession). The API may return data in a structured format such as JSON or XML, which processor 108 may parse and integrate into its internal data repository.

Still referring to FIG. 1A, receiving input data objects 116 may also include processor 108 implementing a chatbot as described further below. The chatbot may operate within a graphical user interface the (GUI) of apparatus 100, providing a conversational interface that allows users to input specific data, ask questions related to regulatory compliance, or retrieve information from external systems, such as regulatory authorities or compliance databases. When the user engages with the chatbot embedded in the GUI, the chatbot may be configured to collect location-based data, user-specific preferences, or even regulatory information directly from the user or external data sources. For example, if a user needs to know specific training requirements for their region, the chatbot can ask the user to input their location (e.g., zip code or GPS coordinates) or additional role-related details (e.g., job function or industry). This data, once collected, is treated as an input data object, which is used by the system to tailor the GUI's content based on the relevant regulatory requirements for the user's geographic region. In addition to direct user input, the chatbot can initiate external data retrieval processes, communicating with third-party regulatory systems, databases, or APIs to gather compliance data. For instance, the chatbot may automatically request the latest regulatory updates from a government API or industry association database, then use that information to update the user's training modules within the GUI. This process allows the chatbot to act as a dynamic data collection interface, retrieving unstructured and structured data in real-time and passing it to the OCR module or machine vision technology for further processing when necessary.

Still referring to FIG. 1A, processor 108 may be configured to perform a geographically based regulation determination by utilizing a geographical mapping module in conjunction with the input data objects 116, including location data and regulatory data. In an example, upon receiving a hospital's location data, such as latitude and longitude, form data objects 116, processor 108 may employ a geospatial analysis algorithm to standardize and map the facility's location, converting it into usable spatial data for determining the applicable regulatory jurisdictions. The geospatial algorithm may perform proximity calculations and boundary analyses to accurately map the facility to the relevant local, state, and federal jurisdictions. Processor 108 may cross-reference the geographic location data with a regulatory database communicatively connected to processor 108 and/or memory 112 that stores safety and building regulations categorized by geographic region. This may be executed using a lookup algorithm designed to match the location coordinates of the facility with the regulatory requirements for the respective jurisdiction. The regulatory database may contain information from federal entities such as OSHA or NFPA, as well as localized building and safety codes. By leveraging the geographic mapping and lookup algorithms, processor 108 may ensure that only the relevant regulatory mandates are selected based on the hospital's location. To enhance precision, processor 108 may utilize a geographic mapping machine learning model (geographic ML model 124). Geographic ML model 124 may include as a supervised learning algorithm, trained on a dataset containing location-specific regulatory requirements and historical safety audit data. This model may be designed to predict the specific set of applicable safety and material regulations, using input features such as geographic location, facility size, and building type. Geographic ML model 124 may continually be refined by incorporating new data, improving its accuracy in predicting region-specific safety and building requirements. The output of the geographic ML model 124 may include a set of predicted regulatory requirements that apply to a specific hospital or behavioral health facility based on its geographic location and relevant factors, such as facility size and type. This output may include a detailed identification of the specific safety and building regulations sourced from federal, state, and local regulatory bodies. For instance, the model may output applicable fire safety standards, structural material compliance rules, occupancy limits, and region-specific building codes.

Still referring to FIG. 1, processor 108 may implement a classification algorithm, referred to as a jurisdiction classifier 128, such as a decision tree or support vector machine (SVM), to categorize the facility into specific regulatory classifications based on the geographic data and the output from the geographic ML model 124. The jurisdiction classifier 128 may be trained on a dataset that includes historical regulatory data, geographic-specific regulations, and facility-specific information such as size, type, and past compliance audits. The training data for the jurisdiction classifier 128 may include labeled examples of facilities categorized under various regulatory frameworks (local, state, and federal) based on their geographic location and facility type. This extensive dataset allows the classifier to learn patterns in how different geographic regions apply distinct regulatory mandates, ensuring accurate classification for future facilities. During operation, the jurisdiction classifier 128 may integrate both the geographic location predictions from the geographic ML model 124 and the facility characteristics (e.g., building type, operational purpose) to identify the precise subset of regulations that apply to the hospital or behavioral health unit. This classification process may allow processor 108 to determine specific safety and material requirements, including fire safety standards, structural material compliance, and occupancy limitations, that are relevant to the specific jurisdiction in which the facility is located. Additionally, processor 108 may process the metadata associated with the input data objects 116, such as publication dates, regulatory sources, and versioning information, using a version control algorithm. The version control algorithm may ensure that the regulatory data being applied to the facility's analysis is up-to-date and relevant. It may work by tracking the release dates and version history of the regulatory documents and cross-referencing them with the currently applied regulations. If any regulations have been updated or replaced by newer versions, the version control algorithm may flag this to ensure that the most recent set of regulations is applied to the analysis. By cross-referencing the outputs of both the geographic ML model 124 and the jurisdiction classifier 128 with the metadata handled by the version control algorithm, processor 108 may verify that the regulations being enforced are not only accurate but also current. This integrated workflow, which combines geospatial mapping, machine learning-based classification, and real-time regulatory cross-referencing, enables processor 108 to accurately determine the complete set of safety and material regulations that apply to the facility, based on its geographic location and operational characteristics. This ensures that the facility maintains continuous compliance, even as regulatory standards evolve over time.

Still referring to FIG. 1A, processor 108 may perform the steps related to material and fixture regulation matching through a regulation-to-material matching module 132. This module may be configured to assess the types of materials and fixtures used in different areas of a facility and determine their compliance with applicable safety regulations. Processor 108 may receive input data objects 116 that include detailed descriptions of the materials and fixtures present in the facility, such as drop ceilings, furniture, wall coverings, and other structural or design elements. This input may include structured data like material specifications from building plans or unstructured data like scanned documents and PDFs containing descriptions of fixtures. Processor 108 may begin by cross-referencing the facility's geographic location and regulatory classifications, as determined by the outputs from the geographic ML model 124 and the jurisdiction classifier 128, with a database of material-specific safety regulations communicatively connected to processor 108 and or memory 112. These regulations can include material fire ratings, structural strength requirements, or anti-ligature standards relevant to behavioral health environments, which often have stricter safety rules to prevent patient harm. The regulation-to-material matching module 132 may utilize an internal rule-based engine or machine learning model trained on a dataset containing examples of compliant and non-compliant materials and fixtures across various regulatory regimes. This dataset may include information about different material types (e.g., fire-resistant materials, anti-ligature fixtures) and their corresponding safety standards, based on historical compliance audits and regulatory guidelines. Training data may include various types of regulations correlated to specific materials and fixtures. This dataset may contain detailed examples of compliant and non-compliant materials across different regulatory categories, such as fire safety, structural integrity, and anti-ligature standards, each associated with corresponding material specifications. For instance, the dataset may pair fire-resistance ratings with materials like fire-rated drop ceilings or flame-retardant wall coverings, anti-ligature requirements with specialized fixtures like breakaway curtain rods in behavioral health settings, and structural strength mandates with specific types of construction materials for load-bearing walls. This dataset may also include historical compliance records, cataloging which materials passed or failed specific regulatory audits, as well as metadata about the geographic or jurisdictional context in which each standard applies. By analyzing the material descriptions provided by the facility and matching them to the regulatory requirements identified for the specific geographic region, processor 108 may determine whether the materials and fixtures used in the facility meet the relevant safety and building standards.

Still referring to FIG. 1A, the output of this matching process may include a detailed compliance assessment, where processor 108 may flag any non-compliant materials or fixtures within the facility. For example, if the drop ceilings in a particular area do not meet fire safety regulations for that jurisdiction, the system may identify this discrepancy and alert the user. Similarly, processor 108 may determine if specific fixtures, such as furniture or wall coverings, do not adhere to safety standards such as anti-ligature requirements in behavioral health environments. In cases where the input data includes unstructured information, such as scanned documents or PDFs, processor 108 may process this data using an OCR module, converting it into a structured format that can be analyzed by the regulation-to-material matching module 132. Once the material and fixture data are fully processed, processor 108 may use the output from the geographic ML model 124 and the jurisdiction classifier 128 to ensure that the matching process is tailored to the specific regulatory requirements of the facility's location. Additionally, processor 108 may leverage the version control algorithm to ensure that the material and fixture assessments are based on the most current regulatory data, ensuring continuous compliance even as safety regulations evolve.

Still referring to FIG. 1A, processor 108 may be configured to perform environmental data input and comparison through an environmental data module 136. "Environmental data," as used herein, refers to any data related to the physical structure and layout of a facility, including but not limited to building plans, material specifications, and fixture information. This data may be received from input data object 116 image data, as processed by processor108, and in various formats, both structured (e.g., CAD files, engineering specifications) and unstructured (e.g., PDFs, images, scanned documents), which describe the materials, fixtures, and architectural elements used in the facility. Environmental data may include detailed blueprints of the building's architecture, engineering reports, material safety data sheets, and fixture specifications. The environmental data module 136 may analyze this data in relation to applicable safety regulations. These safety regulations, previously identified by the geographic ML model 124 and the jurisdiction classifier 128, may be cross-referenced with the building plans, material specifications, and fixture details. The comparison may be executed using a set of rule-based algorithms or a machine learning-based compliance verification model, which may be trained on historical datasets that include facility audits, safety inspections, and environmental data from similar facilities. This training data may include labeled examples of compliant and non-compliant materials and layouts, allowing the model to predict whether the current facility meets the regulatory requirements. For example, processor 108 may be configured to check if the materials specified in the building plans comply with local fire safety regulations, or whether the fixtures in patient rooms meet anti-ligature standards for behavioral health environments. The environmental data module 136 may further analyze structural components, such as walls, ceilings, and flooring, to ensure compliance with durability and safety regulations. If any discrepancies are found between the environmental data and the regulatory requirements, processor 108 may flag these non-compliant elements. Processor 108 could generate a detailed report outlining the specific areas of non-compliance, the regulations that are not being met, and the corresponding parts of the facility affected. For instance, if certain materials do not meet fire resistance standards or specific fixtures fail to comply with safety protocols, these issues may be highlighted in a compliance report.

Still referring to FIG. 1A, processor 108 may be configured to perform discrepancy detection and highlighting through an automated discrepancy detection module 140. This module may work in conjunction with the outputs from the environmental data module 136, geographic ML model 124, and jurisdiction classifier 128 to identify deviations or non-compliance between the environmental data and the relevant regulatory requirements. The environmental data, such as building plans, material specifications, and fixture information, may have been processed and structured by the environmental data module 136, while the geographic ML model 124 and jurisdiction classifier 128 may have determined the specific regulatory standards applicable to the facility based on its location and facility characteristics. Using the processed environmental data and the relevant regulatory outputs, the automated discrepancy detection module 140 may apply rule-based algorithms, or a machine learning model trained on historical safety compliance data to detect discrepancies. The training data for this machine learning model could include labeled examples of compliant and non-compliant materials, fixtures, and facility layouts from various regions and regulatory contexts, ensuring it is capable of detecting violations specific to a wide range of jurisdictions and facility types. The model may utilize the output from the jurisdiction classifier 128, which provides the precise set of applicable safety regulations, and compare it against the environmental data processed by the environmental data module 136 to pinpoint potential compliance violations. For instance, if the geographic ML model 124 and jurisdiction classifier 128 output a set of fire safety regulations and the environmental data specifies a material that lacks the required fire-resistance rating, the automated discrepancy detection module 140 may flag this material as non-compliant. The output from the environmental data module 136, such as material specifications or fixture details, is crucial in this comparison, as it provides the necessary data to validate compliance against the regulatory standards identified by the classifier.

Still referring to FIG. 1A, when discrepancies are detected, processor 108 may generate detailed alerts that specify which particular regulation is being violated, which part of the facility is affected, and the nature of the non-compliance. These alerts are directly tied to the analysis performed by the preceding modules, ensuring that they are grounded in accurate regulatory data and facility-specific environmental information. For example, if certain fixtures in patient rooms do not comply with anti-ligature standards as determined by the jurisdiction classifier 128, processor 108 may flag the affected areas and highlight the specific regulatory requirements that are not being met. Processor 108 may then deliver real-time notifications through a graphical user interface (GUI) or generate automated reports that present the identified discrepancies. These alerts could prioritize discrepancies based on the severity of the non-compliance and the associated safety risks. Apparatus 100 may also provide recommendations for corrective actions, such as replacing non-compliant materials or adjusting facility layouts to meet the required safety standards.

Still referring to FIG. 1A, processor 108 is configured to generate, through an assessment module 144, simulated assessment data sets 148. This process may include integrating multiple data inputs, including image data, geographic data, and jurisdiction-specific regulatory data, to generate simulated assessment data sets 148 through the assessment module 144. This assessment module 144 may include various models and algorithms, each responsible for processing different forms of input data, such as images, text, geographic location, and regulatory metadata, to produce a comprehensive evaluation of a facility's audit readiness. "Simulated assessment data sets," as used herein, are a collection of structured data designed to mimic real-world evaluations, audits, or surveys. These data sets may include mock questions, compliance checks, and readiness assessments tailored to the specific operational and regulatory conditions of the facility being evaluated. They may be used to assess the preparedness of the facility for actual audits or accreditation processes, providing a realistic evaluation framework based on the inputs and regulatory standards applicable to the facility. The machine vision system, for example, may be integrated into the assessment module 144 to process visual inputs like images or video frames captured from the facility environment as described above. Additionally, processor 108 may incorporate geographic data of the geographic ML Model 124 and jurisdiction classifier 128 to determine the specific regulatory requirements based on the facility's location. Once the visual, geographic, and jurisdictional data are processed, the assessment module 144 may generate the simulated assessment data sets 148.

Still referring to FIG. 1A, initially, the assessment module 144 may implement rule-based algorithms to handle the foundational compliance checks. These algorithms may be pre-programmed with a set of rules derived from regulatory standards and audit guidelines. Technically, the rule-based engine may operate by applying if-then logic to assess whether specific environmental elements comply with established regulations. Each rule within the engine may be associated with a condition (the "if" statement) and an action or decision (the "then" statement), which defines how compliance is verified. For instance, the engine may receive structured environmental data from the machine vision system, which includes details about materials, fixtures, and safety equipment within the hospital environment. This data may be categorized into attributes such as "fire-rated door," "anti-ligature fixture," or "non-slip flooring." The rule-based engine may process this data by cross-referencing it with a predefined set of regulatory rules, which are stored in the engine's knowledge base. The knowledge base may contain encoded rules that specify the minimum safety and compliance requirements. For example, one rule might be: IF a door is located in a fire exit pathway, THEN it must be fire-rated to a certain standard (e.g., 90 minutes). The rule-based engine may take the input data object 116 (e.g., a door categorized as a fire exit) and match it against the rule. If the condition is met (i.e., the door is located on a fire exit pathway), the engine checks if the attribute "fire-rated" is present in the structured environmental data and whether it meets the required fire-resistance rating.

Still referring to FIG. 1A, the engine may rely on pattern matching algorithms to evaluate whether the environmental data satisfies the rule conditions. In this case, the pattern-matching process may include identifying attributes such as "fire-rated" or "anti-ligature" and comparing them against the specific thresholds set by the regulatory body, such as the NFPA (National Fire Protection Association) for fire safety standards. In more complex scenarios, the rule-based engine can apply nested or hierarchical rules. For example, a fixture might need to meet both general safety regulations and specific behavioral health requirements. In such cases, the engine checks against multiple sets of conditions: IF the fixture is in a psychiatric ward, THEN it must be anti-ligature. IF the fixture is located in a fire exit pathway, THEN it must be fire-resistant. The rule-based engine may evaluate each of these conditions separately and generate a compliance status for each element, which may flagged as either compliant or non-compliant. This result may be added to the overall simulated assessment data set, where each rule check contributes to the final evaluation. Additionally, the rule-based engine supports dynamic rule updates. New regulations or updates to existing guidelines can be programmed into the system, allowing the engine to automatically adapt to changes in regulatory frameworks without requiring manual reconfiguration. For instance, if new fire safety standards are introduced, such as an increase in the fire-resistance rating for certain materials, the knowledge base can be updated with the new thresholds, and the engine will automatically apply these rules to future assessments. The decision-making process in the rule-based engine may be deterministic, meaning that once a set of conditions is met, the engine produces a clear, consistent outcome based on the rules. The engine can also provide explanation outputs, detailing which specific rules were applied and how the compliance decision was reached, which is important for audit transparency and documentation.

Still referring to FIG. 1A, once the initial rule-based verification is complete, the assessment module 144 may employ a natural language processing (NLP) algorithm/model trained on a dataset of regulatory documentation, accreditation surveys, and historical compliance data. The NLP system may be tasked with processing textual input data from input data objects 116, such as regulatory descriptions and compliance documentation provided by the hospital. By applying text classification and entity recognition techniques, the NLP algorithm may extract relevant compliance information from these documents, cross-referencing them with the regulatory requirements determined by the geographic ML model 124 and jurisdiction classifier 128. To achieve this, the NLP model may be structured as a combination of several processing layers, such as tokenization, part-of-speech tagging, named entity recognition (NER), and dependency parsing. In the tokenization step, the algorithm may break down the input text (e.g., regulatory documents or compliance guidelines) into individual tokens or words, while the part-of-speech tagging assigns grammatical labels (e.g., noun, verb) to each token. Next, named entity recognition may identify specific entities, such as "fire safety," "compliance manual," or "anti-ligature standards," which may be critical for understanding the context of the regulatory documentation. Additionally, the NLP algorithm may us dependency parsing to understand the syntactic structure of sentences, allowing the system to comprehend relationships between different entities and compliance terms. For example, it may recognize the phrase "must comply with anti-ligature safety standards in patient rooms" and understand that "anti-ligature safety standards" is the requirement, and "patient rooms" is the area where the requirement applies. The text classification component of the NLP model may categorize different sections of the document based on predefined compliance categories, such as fire safety, patient security, or material durability. This categorization allows the system to identify which sections of the regulatory document apply to specific hospital functions, such as the emergency room or psychiatric unit. Entity recognition may be further enhanced using word embeddings like word2vec or BERT (Bidirectional Encoder Representations from Transformers), which may be trained on large corpora of regulatory text to understand the semantic relationships between words and phrases. These models enable the system to interpret industry-specific terms and regulatory language, ensuring accurate extraction of compliance-relevant information. After processing and classification, the NLP algorithm may generate compliance questions based on the extracted entities and classified sections. For example, if the system identifies a section on fire safety compliance, it may generate questions related to fire exits, fire-resistant materials, and fire safety drills. These questions are then cross-referenced with the structured data from the machine vision system and geographic regulatory data to ensure consistency. The NLP system may apply a question generation model, such as a sequence-to-sequence (Seq2Seq) model, trained to convert structured compliance data into human-readable questions, mimicking the style of real-world audit surveys. By processing these textual and regulatory inputs in conjunction with structured environmental data, the NLP model ensures that the simulated assessment data sets 148 include both physical safety compliance and procedural regulatory requirements.

Still referring to FIG. 1A, after these initial steps, the assessment module 144 may employ a supervised machine learning model to further refine the simulated assessment data sets 148. This model may be trained on a diverse dataset of historical audit results, compliance evaluations, and facility-specific audit outcomes. The model may generate predictive questions and compliance checks based on the facility's current status. For example, the model may analyze the structured environmental data and previous survey responses to predict areas where the hospital might be at risk of non-compliance. This predictive capability allows the assessment module 144 to anticipate potential audit failures and generate mock survey questions designed to evaluate these weak points. The machine may operate by identifying patterns in past audit data and applying these insights to the current simulated dataset. The model may uses regression analysis and classification techniques to predict areas where non-compliance is likely based on the patterns detected in similar facilities or similar regulatory conditions. For example, if hospitals of a certain size and geographic region have historically struggled with fire safety compliance, the model will prioritize questions related to fire safety for the current hospital's mock survey.

Still referring to FIG. 1A, next the assessment module 144 will output a comprehensive simulated assessment data set that includes a variety of mock survey questions, compliance checks, and/or regulatory evaluations. These questions may be tailored to the specific facility based on its operational characteristics, geographic location, and the outputs from the earlier modules. The result may be a set of mock survey data that closely simulates the structure and content of real audit surveys distributed by accreditation bodies such as the Facility Guidelines Institute (FGI) or the Centers for Medicare & Medicaid Services (CMS). Processor 108 may display the simulated assessment data set through a GUI as described below. The GUI may allow the user to view the assessment data, which may include visual representations such as graphs, tables, or other structured data formats to enhance usability and readability. Through the same GUI, Processor 108 may facilitate receiving user input in the form of assessment feedback 152. The user can interact with various GUI elements, such as forms, sliders, or buttons, to provide their evaluation or responses to the displayed data.

Once the feedback is entered, it is transmitted back to Processor 108, where the data is processed. This feedback may then passed to a scoring ML model 156 to generate the assessment score 160. The scoring ML model 156 may be designed to analyze the input data, including both the simulated assessment data and the assessment feedback 152, by applying predefined algorithms trained on similar data sets. The scoring ML model 156 may be trained using a combination of historical assessment data and simulated datasets. Historical data may include previously scored assessments where human experts have provided scores, serving as the ground truth for training. The model learns patterns and correlations from this data, including the characteristics of input data and the corresponding scores given by experts. Simulated assessment data is also included to introduce variability and ensure that the model is exposed to a broader range of possible inputs. Additionally, the model may be trained on user feedback data, which captures how users interacted with similar assessments in the past, such as providing subjective evaluations or corrective inputs through the GUI. This comprehensive dataset allows the ML model to generalize well to new, unseen data, enabling it to automatically generate accurate scores based on both the input data and user feedback received during real-time assessments. The scoring ML model 156 may use a combination of techniques such as regression analysis, classification, or neural networks, depending on the nature of the assessment and scoring criteria.

Still referring to FIG. 1A, the scoring ML model may evaluate the data using learned patterns, taking into account various factors such as accuracy, consistency, and relevance of the assessment feedback 152. It may then generates a final assessment score 160, which is displayed to the user through the GUI, completing the process of data visualization, user interaction, and intelligent scoring. The assessment score 160 may be formatted in various ways. One embodiment may include a percentage-based score, where the model assigns a score as a percentage (e.g., 85%), representing the level of accuracy, completeness, or performance relative to the ideal outcome. This format is particularly useful in situations where precise numerical grading is necessary, such as technical assessments or tests. Another embodiment may include the use of scales, where the score is presented on a numerical scale (e.g., 1 to 10, or 1 to 100). This approach allows for more granular differentiation between different levels of performance and can be tailored based on the nature of the assessment. For example, a scale of 1 to 5 might be used for simpler evaluations, while a 1 to 100 scale could offer more detailed grading in complex assessments. In addition to numeric formats, the score could be displayed as descriptive words or categories (e.g., "Excellent," "Good," "Needs Improvement"), allowing for easier interpretation in cases where a qualitative assessment is more appropriate.

Still referring to FIG. 1A, processor 108 may be configured to generate a comprehensive safety analysis report 164 by aggregating and synthesizing the outputs from the environmental data module 136, geographic ML model 124, jurisdiction classifier 128, and automated discrepancy detection module 140. The process of aggregation may involve a multi-step aggregation algorithm designed to collect, organize, and correlate the outputs from these modules into a structured format for the final report, ensuring that each component of the facility's safety compliance is thoroughly analyzed and clearly presented. Technically, the aggregation algorithm may be implemented as a data fusion process, where the outputs from different modules are systematically integrated into a unified representation. This algorithm may include stages of data normalization, where disparate formats of data (e.g., structured environmental data from building plans and unstructured textual data from regulations) are harmonized into a common data structure. It may also employ relational mapping techniques, which establish logical links between the regulatory requirements provided by the geographic ML model 124 and the facility-specific details processed by the environmental data module 136. By using relational databases or object-oriented data models, the aggregation algorithm can efficiently organize these different data types for streamlined comparison and analysis.

Still referring to FIG. 1A, processor 108 may execute this aggregation algorithm by first collecting structured environmental data from the environmental data module 136, which processes building plans, material specifications, and fixture details. Next, the geographic ML model 124 may provide a set of applicable safety regulations, determined based on the geographic location and characteristics of the facility. These regulations may be further categorized by the jurisdiction classifier 128, which applies a classification algorithm to identify the specific local, state, and federal regulations that apply to the facility. The aggregation algorithm may then integrate the outputs from the various modules by correlating each piece of environmental data with its relevant regulatory counterpart. This could be achieved through a data merging algorithm, which links environmental attributes (such as material types or fixture locations) to corresponding regulatory mandates (such as fire resistance requirements or anti-ligature standards) based on predefined relational keys. For instance, a specific material used in a patient room might be matched to the fire safety regulations applicable in that jurisdiction, as determined by the jurisdiction classifier 128. Once this initial structuring is complete, processor 108 may use the outputs of the automated discrepancy detection module 140 to identify any areas where the environmental data does not meet the applicable regulatory standards. The aggregation algorithm may flag these discrepancies, specifying which regulations are violated and which parts of the facility are affected. These flags are added into the structured report, ensuring that the final document provides a comprehensive view of both compliant and non-compliant aspects of the facility.

Still referring to FIG. 1A, to finalize the safety analysis report 164, processor 108 may employ a report structuring sub-algorithm, which formats the aggregated data into a readable, prioritized format. This sub-algorithm could prioritize the most critical discrepancies—those posing the greatest safety risks—by assigning them higher prominence within the report. The report may be divided into sections, such as "Facility Overview," "Regulatory Compliance Summary," and "Discrepancy Details," each of which contains the relevant findings based on the aggregated data. The version control algorithm may then be applied to ensure that the regulatory standards referenced in the report are up-to-date. Processor 108 may check the metadata (such as publication dates and revision histories) of the regulatory data and cross-reference it with the most current versions of the safety regulations to ensure the report is accurate and current. Any outdated regulations are automatically updated by the system before the report is finalized. The final safety analysis report 164 may be presented through a GUI or generated as a downloadable document.

Still referring to FIG. 1A, processor 108 may be configured to incorporate a heatmap visualization within the safety analysis report 164, using color-coded indicators to represent areas of compliance and non-compliance within the facility. This heatmap may be updated in real-time as new environmental data is received and processed by the system. The generation and continuous update of the heatmap may be managed using a combination of data visualization algorithms and real-time data processing techniques. To create the heatmap, processor 108 may first processes input data objects 116, which may include environmental data such as building plans, material specifications, and fixture details. This data may then be analyzed against the regulatory requirements determined by the geographic ML model 124 and the jurisdiction classifier 128, which identify the applicable safety standards based on the facility's location and operational characteristics. The automated discrepancy detection module 140 may further analyze this environmental data to identify areas of non-compliance. Once this analysis is complete, processor 108 may employ a grid-based layout algorithm to map the facility's layout into a structured grid format, where each cell represents a specific area of the facility, such as a room or section. Each cell in the grid is assigned a compliance score based on the data provided by the automated discrepancy detection module 140, which determines whether the area complies with the relevant safety regulations. A "compliance score," as used herein, is an objective metric that indicates how well a facility adheres to relevant safety regulations and standards. It may be calculated by comparing structured environmental data (e.g., building plans, material specifications, fixture details) with applicable local, state, and federal regulations, as identified by the geographic ML model and jurisdiction classifier. A compliance score may then be visualized as a color on the heatmap, with different colors representing varying levels of compliance. For example, green may represent full compliance, yellow may indicate partial compliance or areas needing attention, and red may highlight areas of critical non-compliance. The assessment score 160 and compliance score differ in both purpose and data inputs. The assessment score 160 may evaluate a facility's performance based on assessment feedback 152 and operational criteria, incorporating both qualitative and quantitative elements. It is dynamic and reflects subjective user evaluations alongside objective operational data. In contrast, the compliance score may be an objective measure based on the facility's adherence to predefined regulatory standards. While the assessment score 160 may vary based on the user's experience or input, the compliance score nay be more grounded in legal and safety requirements and not consider subjective feedback.

Still referring to FIG. 1A, processor 108 may use greedy algorithms to prioritize and update the most critical cells in the heatmap in real-time, particularly when new environmental data is received or when a regulatory update is detected. This ensures that any changes in the compliance status of specific areas of the facility are reflected immediately in the heatmap, giving facility managers an up-to-date visualization of the current state of compliance. For instance, if a non-compliant material is detected in a particular room, the heatmap may update to highlight that room in red, prompting immediate review and action. In addition to grid-based layout algorithms, processor 108 may also apply visual hierarchy techniques to ensure that the most critical areas of the heatmap are visually emphasized. High-priority zones, such as patient rooms or areas flagged for severe non-compliance, may be rendered with more intense color contrasts or positioned prominently within the heatmap. These visual hierarchy techniques help guide the user's attention to the most pressing compliance issues within the facility. Furthermore, the heatmap visualization may be continuously updated using real-time data processing techniques. As new environmental data is input—whether through updates from the data crawler or direct user inputs—processor 108 analyzes the incoming data, recalculates the compliance scores, and updates the heatmap accordingly. This dynamic updating ensures that facility managers always have the most current representation of compliance status, allowing them to take immediate corrective actions when necessary.

Still referring to FIG. 1A, processor 108 is configured to modify the architecture of a GUI 168 based on the input data objects 116. A "graphical user interface," as used herein, refers to the visual component of a software application that allows users to interact with the system through graphical elements, such as buttons, menus, icons, text fields, and other interactive components, rather than relying on text-based commands or code. GUI 168 acts as a dynamic platform that displays regulatory data, training modules, and user-specific content, adjusting in real-time to accommodate the user's location, role, and compliance requirements. When processor 108 receives input data objects 116—such as structured and unstructured regulatory data, geospatial coordinates, and metadata—it processes this information and reconfigures the layout and content displayed on GUI 168 in real-time. The architecture of GUI 168 refers to the underlying structure and arrangement of its elements, including menus, interactive widgets, content panels, and visual indicators. By modifying this architecture, processor 108 ensures that the most relevant information is prioritized, organized, and presented to the user based on their specific needs and regulatory requirements. For example, when the processor 108 retrieves safety and building regulation data tied to a specific location (e.g., local fire safety standards or state-mandated building codes), processor 108 may adjust the GUI 168 to highlight those regulations prominently. The GUI 168 may reorganize its elements to display urgent notifications about non-compliance issues, safety analysis report 164s that must be reviewed to meet local compliance standards, or additional training materials specific to the facility's geographic region.

Still referring to FIG. 1A, processor 108 may also modify the interactive elements of GUI. This may include adjusting buttons, drop-down menus, text input fields, or other navigational elements to streamline the user's interaction with the system. For example, if a user needs to select a training module, processor 108 may change the state of certain buttons or menus to only show relevant training options based on the user's regulatory needs or previous actions. For example, if a user needs to configure aspects of the safety analysis report 164 for a behavioral health facility, processor 108 may change the state of certain buttons or menus to only show relevant safety analysis options based on the facility's specific regulatory needs or previously analyzed data. The GUI 168 may allow users to customize the focus of the safety analysis report 164, adjusting the focus to emphasize particular aspects, such as suicide prevention, patient security, or material durability. The GUI 168 would adapt in real-time, displaying interactive controls that allow the user to select and prioritize the aspects of the safety analysis most relevant to their unit, ensuring that the report is tailored to the unique safety requirements of the facility.

Still referring to FIG. 1A, the architecture of GUI 168 may be further modified based on event-driven logic, where user actions trigger changes to the interface. "Event-driven logic," as used herein, is a programming paradigm where the flow of execution and behavior of a system are determined by events, specific actions, or occurrences detected by a system. In the context of a graphical user interface, event-driven logic may react to events like clicks, touches, keystrokes, system changes (e.g., location or time-based triggers), and adjusts the interface or system behavior accordingly. For example, when a user completes a training module, the processor might update GUI 168 to show progress indicators, unlock additional content, or display completion certificates. These event-driven changes ensure that GUI 168 remains responsive to the user's input and provides real-time feedback and updates.

Still referring to FIG. 1A, processor 108 may use machine learning models to further enhance the dynamic architecture of GUI. The machine learning algorithms may analyze historical data on user interactions, click patterns, and content engagement to predict which interface elements are most relevant to the user. This predictive adjustment may allow processor 108 to modify GUI 168 architecture even before the user takes action, streamlining the interaction flow and ensuring that the user has a personalized and optimized experience. For instance, if it's detected that users in a particular region tend to interact more frequently with certain training modules, processor 108 may adjust GUI 168 to display those modules more prominently for new users in the same region. Similarly, if certain tasks are commonly completed in a specific sequence, the machine learning model can reconfigure GUI 168 layout to the user through the same sequence, reducing the time spent navigating the interface. Additionally, processor 108 may implement an adaptive layout engine that automatically scales and adjusts GUI 168 based on the user's device type, screen size, and input method (e.g., touch or mouse). An "adaptive layout engine," as used herein, is a system component designed to automatically adjust and reorganize the structure and layout of a graphical user interface in response to various factors. This engine allows GUI 168 to remain flexible and responsive across different platforms, such as desktops, tablets, and smartphones. Processor 108 may analyze input data about the user's device (e.g., screen resolution, orientation) and modify GUI 168 architecture to ensure optimal usability. For example, on a smaller mobile device, processor 108 may condense certain elements or shift interactive components to maximize screen space, ensuring that key compliance information remains visible.

Still referring to FIG. 1A, processor 108 may be configured to enable voice-activated command inputs within the GUI, facilitating hands-free operation of GUI. To achieve this, processor 108 may integrate a natural language processing (NLP) module that interprets spoken commands and translates them into actionable inputs for the system. This hands-free interface may enhance usability, particularly in scenarios where users are performing multiple tasks or require quick access to compliance data without using traditional input methods. When a user issues a spoken command, the NLP module may process the audio input by analyzing the speech patterns, identifying key phrases, and extracting intent related to the user's request. The module may use speech-to-text algorithms to convert the spoken language into text, which is then processed to determine the relevant command. For instance, if a user asks, "What are the latest compliance updates for patient security?" processor 108 may interpret this request through the NLP module and automatically query the relevant safety regulations for patient security in the behavioral health facility. Once the command is interpreted, processor 108 may execute a corresponding set of actions. For example, if the spoken command pertains to initiating a safety compliance check, processor 108 may trigger a sequence of actions to analyze the facility's current data, check it against applicable regulatory standards, and display the results within the GUI. If the command is related to data entry—such as updating fixture details or material specifications—processor 108 may use the NLP module to input the spoken data directly into the system's database, minimizing manual input and expediting the process.

Still referring to FIG. 1A, modifying the architecture of GUI 168 may include altering a spatial arrangement of display elements using a machine learning model trained to prioritize the display of information. Altering a spatial arrangement of display elements may include methods as described above. The spatial arrangement may vary depending on factors like screen size, user preferences, and the relevance of the information to the user's location. For example, if certain safety regulations or material compliance standards are critical for users in a specific state or region, processor 108 may modify the layout of the GUI 168 to push those region-specific regulations or safety assessment sections to the top of the display within the safety analysis report 164. This ensures that they are the first items the user sees. Processor 108 analyzes input data, such as the user's geographic location or facility-specific data, and determines the most relevant information, modifying the arrangement of GUI 168 elements accordingly. Processor 108 may continuously evaluate the most relevant data in real-time and reposition elements within GUI 168 to ensure that information critical to the user's region is prominently displayed.

Still referring to FIG. 1A, to further enhance the user experience, modifying the spatial arrangement of GUI 168 may incorporate the assessment score 160 by positioning high-priority items or areas with critical discrepancies more prominently within the layout. After the assessment module 144 generates a comprehensive set of simulated assessment data, the scoring ML model 156 may analyze and output the assessment score, which reflects the facility's current compliance status, accuracy, and adherence to safety standards. Processor 108 may use this score to adaptively arrange GUI 168, elevating areas within the safety analysis report 164 that contain discrepancies or that indicate areas needing improvement. For example, if certain material compliance checks or regulatory evaluations score below a specified threshold, processor 108 may reconfigure GUI 168 to position these sections at the top, or in more visually prominent locations, ensuring the user immediately sees items of concern. By incorporating layout algorithms and visual hierarchy techniques, processor 108 can rank discrepancies by their severity as indicated by the score, using a constraint satisfaction algorithm to ensure high-priority issues maintain visibility across devices of varying screen sizes and orientations. For example, items with lower compliance scores may be marked in contrasting colors or highlighted in dedicated panels at the top of GUI 168, allowing users to quickly access these sections and take corrective actions.

Still referring to FIG. 1A, processor 108 may employ a combination of layout algorithms and visual hierarchy techniques to determine how elements are arranged, focusing on prioritization and clarity. Layout algorithms are computational methods used by the processor to determine the optimal positioning of GUI 168 elements. These algorithms take into account the size, importance, and relationships between various interface components, adjusting GUI's layout in response to incoming data (such as user location and regulatory updates). In apparatus 100, layout algorithms may be responsible for arranging elements based on priority. Processor 108 may employ algorithms such as constraint satisfaction algorithms to prioritize the most important interface elements, such as buttons for starting critical compliance training, notifications for regulatory updates, or mandatory content panels. These algorithms impose constraints (e.g., required visibility, positioning at the top of the screen) and solve for the most optimal arrangement of GUI 168 elements based on the current state of the user's regulatory environment. In situations where GUI 168 needs to be updated in real-time (e.g., when a new location is detected or a new regulation is passed), greedy algorithms may be employed by processor 108. Greedy algorithms may select the highest-priority elements (e.g., a "Start Training" button or urgent compliance alert) and place them in the most prominent positions within GUI 168 (such as at the top or center of the screen). These algorithms make decisions step-by-step, selecting the most optimal position for each element based on its relative importance and the available screen space, without requiring the entire layout to be recalculated from scratch. Processor 108 may also utilize grid-based layout algorithms, which divide the screen into a grid of predefined regions or cells. Each interface element—whether it's a content panel, interactive button, or visual component—may be assigned to a specific cell based on its priority and size. For instance, a high-priority compliance notification might occupy the top-left cell (a position that typically draws the most user attention), while less important elements might be assigned to lower, peripheral cells. The grid-based layout ensures that GUI 168 remains organized and structured, even as elements are rearranged. The layout algorithm may also handle multidimensional constraints, such as screen size, device type (desktop, tablet, mobile), and the user's input method (touchscreen vs. mouse). For example, on a mobile device with limited screen real estate, the algorithm might prioritize the placement of critical compliance buttons and hide secondary elements behind collapsible menus or tooltips. Visual hierarchy techniques may be design principles that guide the user's attention to the most important elements of the interface. These techniques help apparatus 100 ensure that compliance-critical information is presented prominently, while less relevant data is deprioritized or minimized.

Still referring to FIG. 1A, modifying the GUI 168 comprises automatically generating context-sensitive command inputs that trigger analysis routines within the GUI. Processor 108 may receive input data objects, such as location data from the geographic ML model 124, regulatory classifications from the jurisdiction classifier 128, and safety compliance information from the automated discrepancy detection module 140. Based on the received data, processor 108 may generate a sequence of command inputs tailored to the user's specific context, such as the facility's geographic location, applicable regulatory requirements, and the current state of safety compliance. These command inputs may be designed to adjust the GUI 168 in real-time, ensuring that only relevant and high-priority information is displayed. Upon generating these command inputs, processor 108 triggers context-sensitive routines that adapt the GUI's behavior based on real-time data. For instance, if new regulatory data is detected for the facility's region, processor 108 may execute commands that update the GUI's display to reflect the latest safety requirements. In addition, processor 108 may reconfigure the layout of the GUI 168 based on the outputs from the geographic ML model 124 and the jurisdiction classifier 128, adjusting the spatial arrangement of interactive elements, such as alerts, safety analysis report 164s, and compliance controls. This ensures that critical, location-specific safety regulations are presented prominently, allowing the user to prioritize their actions. If processor 108 detects discrepancies between the facility's environmental data and the updated regulatory standards, it may automatically trigger a command sequence to adjust the GUI. This adjustment may include prioritizing critical alerts or repositioning interactive controls that allow the user to review discrepancies and take corrective actions. To streamline the user experience, processor 108 may continuously monitor the user's context and generate new command sequences as needed, minimizing the need for manual input and ensuring that the GUI 168 remains responsive to changes in real-time. By executing these steps, processor 108 ensures that the GUI 168 adapts to present the most relevant safety information based on the user's location, regulatory environment, and facility-specific safety requirements, providing real-time updates and maintaining a streamlined workflow for the user.

Still referring to FIG. 1A, processor 108 may be configured to automatically generate context-sensitive command inputs using a machine learning model trained on historical user interactions, environmental data comparisons, and compliance outcomes. This machine learning model may have been trained using a dataset that includes historical data on user inputs, previous safety analysis reports 164, and the results of compliance checks in behavioral health facilities. The model may be optimized to streamline the sequence of inputs required to guide the user through identifying areas of non-compliance, particularly related to material usage and fixture installation within the facility. When the processor 108 receives real-time environmental data and compares it with applicable safety regulations using the automated discrepancy detection module 140, the machine learning model may automatically generate command inputs tailored to the detected compliance issues. These command inputs could trigger GUI 168 modifications that prioritize and highlight non-compliance areas. For example, if the system detects that certain materials or fixtures used in the facility do not meet fire resistance or anti-ligature standards, processor 108 may adjust the GUI 168 to bring these issues to the forefront, ensuring the user's attention is drawn to the most critical areas requiring corrective action. The machine learning model, trained on previous compliance outcomes, may also be configured to suggest corrective actions specific to the identified issues. Processor 108 may automatically generate a sequence of commands that guide the user toward actions such as replacing non-compliant materials or fixtures or updating the safety protocols within the facility. The GUI 168 may adjust to display relevant recommendations and interactive options for addressing these discrepancies, minimizing the need for manual navigation.

Still referring to FIG. 1A, modifying the GUI 168 includes reconfiguring the GUI 168 to adjust the display hierarchy of interactive elements based on the relevance of input data objects. Adjusting the display hierarchy of interactive elements may include using a combination of layout algorithms and visual hierarchy techniques as described above. Processor 108 may apply algorithms such as constraint satisfaction algorithms to prioritize the display of the most important interface elements, including buttons for initiating safety analysis, compliance notifications, and mandatory content panels. These algorithms impose constraints, such as ensuring critical elements remain visible at the top of the screen, solving for the most efficient arrangement based on the user's regulatory environment. For example, if the input data indicates that a new regulatory update affects fire safety regulations in the user's geographic region, the constraint satisfaction algorithm may adjust the layout to push relevant compliance alerts or a "Review Fire Safety"

button to a prominent location. To ensure real-time updates to the GUI, processor 108 may optionally use greedy algorithms, which prioritize high-importance elements (such as critical compliance notifications or "Start Training" buttons) and place them in the most visible positions within the GUI, such as the top or center of the screen. The greedy algorithm processes the layout step-by-step, selecting the optimal position for each element based on its relative importance, without recalculating the entire layout. This allows the GUI 168 to update quickly when new input data, such as location changes or regulatory updates, is detected. Furthermore, processor 108 may employ grid-based layout algorithms to organize the screen into predefined regions or cells. Each interface element, such as a compliance notification, interactive button, or content panel, may be assigned to a specific cell based on its priority and size. For example, a high-priority compliance alert might be positioned in the top-left cell, which typically draws the most user attention, while less urgent elements may be relegated to lower or peripheral cells. This grid-based layout ensures that the GUI 168 remains organized and structured, even as elements are rearranged in response to real-time data. Processor 108 may also take into account multidimensional constraints, such as screen size, device type (desktop, tablet, or mobile), and the user's input method (touchscreen vs. mouse). For instance, on a mobile device with limited screen space, the layout algorithm may prioritize the placement of critical compliance elements while hiding secondary information behind collapsible menus or tooltips.

Still referring to FIG. 1A, the display hierarchy within GUI 168 may further be prioritized based on the assessment score 160, incorporating this score as a key parameter in ranking the relevance of displayed elements. By leveraging the assessment score, processor 108 may adjust the prominence of specific elements, such as compliance notifications, issue alerts, or buttons for high-priority tasks. For instance, when the assessment score indicates areas of low compliance, processor 108 may utilize a constraint satisfaction algorithm to elevate related notifications and interactive elements to the top of the screen, ensuring immediate user visibility. These critical elements might include buttons to address high-priority discrepancies, particularly those tied to location-specific safety regulations or time-sensitive corrective actions. In addition to using a constraint satisfaction algorithm, the GUI 168 hierarchy can further implement greedy algorithms and grid-based layout methods to adjust in real-time as the assessment score changes. For instance, an updated score reflecting new discrepancies could trigger a greedy algorithm to step-by-step reposition elements of greatest importance, maintaining a user-focused hierarchy without recalculating the entire layout. The grid-based approach may then organize these elements across predefined screen regions, where each cell's position reflects the score-based priority.

Still referring to FIG. 1, processor 108 may be configured to configure a display device 172, using the reconfigured GUI, to execute a simulation module 176 to model hypothetical modifications based on the input data objects. A "display device," as used herein, refers to any hardware capable of presenting the graphical user interface (GUI), such as monitors, tablets, or touchscreens to execute a simulation module 176 through the reconfigured GUI. This simulation module 176 may include a simulation model 180 that allows apparatus 100 to model hypothetical modifications to the facility's layout, materials, and safety measures based on the input data objects 116. A simulation model of a building layout may be in either 2D or 3D and provide a virtual representation of a facility's spatial organization for analyzing safety compliance, environmental impact, or operational efficiency. These objects may include environmental data, such as material specifications and building plans, or updated regulatory requirements relevant to the behavioral health facility. The simulation provides a real-time, interactive visualization of how potential changes would affect safety compliance and facility operations. When processor 108 receives input data object 116, such as new regulatory updates or user-requested facility modifications, it may be used the reconfigure GUI 168 to display the simulation module 176 on the display device 172. The simulation is powered by a combination of rule-based algorithms and machine learning models that analyze the potential outcomes of these hypothetical modifications. For example, a user may want to simulate the replacement of non-compliant materials with alternative, compliant ones. The rule-based algorithms evaluate the compliance of the new materials with existing regulations, while the machine learning model trained on historical safety data, past compliance checks, and facility layout information predicts how these modifications will affect the facility's overall safety profile. The machine learning model behind the simulation module 176 may be trained using datasets that include previous safety audit results, environmental data, and user interaction history with the system. This training data may enable the model to predict outcomes with high accuracy, identifying potential compliance improvements or risks associated with specific changes. For example, the model can simulate the impact of new fire-resistant materials or updated safety protocols on overall compliance. As the model is continuously trained on new data from user interactions and regulatory updates, it improves over time, becoming more accurate in predicting compliance outcomes for various hypothetical scenarios. Once the simulation module 176 is initiated, processor 108 may use a grid-based layout algorithm to segment the facility into specific areas, such as rooms or sections, where modifications can be modeled. Each grid cell may be updated in real-time based on the simulation's outcomes. For instance, when simulating a change to the materials used in patient rooms, processor 108 updates the relevant grid cells to reflect the compliance status of these areas, color-coding them based on predicted compliance with safety standards (e.g., green for compliant, red for non-compliant).

Still referring to FIG. 1A, users can interact with the simulation through the reconfigured GUI 168 in several ways. The GUI 168 may present interactive controls, such as sliders, dropdown menus, and buttons, allowing users to adjust simulation parameters in real-time. For example, users could select different materials or adjust regulatory thresholds to see how these changes would impact compliance. Processor 108 may handle these interactions through event-driven logic, which triggers updates to the simulation in response to user inputs. If a user changes a parameter, such as selecting a different material for ceiling fixtures, the simulation module 176 re-runs the analysis, recalculating the potential impact on compliance and safety. As the user interacts with the simulation, processor 108 may also employ constraint satisfaction algorithms to ensure that any proposed modifications meet all relevant safety and regulatory constraints. These algorithms may impose limits on the simulation, preventing users from modeling modifications that would result in non-compliance. For instance, if a proposed material change would violate fire safety regulations, the constraint satisfaction algorithm may flag this and suggest alternative materials or design adjustments. In addition, processor 108 nay use visual hierarchy techniques to guide the user's focus on critical outcomes of the simulation. The GUI 168 might highlight high-risk areas, such as rooms with non-compliant materials, by making them more prominent on the display device 172 through the use of color-coded indicators, pop-up notifications, or other visual cues. This visual hierarchy helps ensure that users are directed to the most critical areas requiring attention during the simulation process. The results of the simulation may be updated on the display device 172 as the user interacts with the GUI. These results may include visual data, such as heatmaps or compliance charts, that show the predicted effects of the modifications. For example, if the user models replacing flooring materials in patient rooms of a behavioral health facility with compliant fire-rated alternatives, the system may display a heatmap indicating improved compliance in those areas. This heatmap may show color-coded indicators, with rooms that now meet fire safety standards highlighted in green, while areas that remain non-compliant or require further assessment may be shown in yellow or red. This visual representation allows users to immediately see the impact of the proposed modifications on patient safety and regulatory compliance within the facility. In a behavioral health environment, where patient safety is paramount, such a simulation enables facility managers to evaluate the effectiveness of their proposed changes in real-time, ensuring that adjustments to materials not only meet fire safety standards but also maintain a safe environment for patients before implementing them in the actual facility.

Still referring to FIG. 1A, regarding the safety analysis report, the assessment score 160 may play a role in determining the compliance status and overall safety rating of the facility. After the scoring ML model 156 generates the assessment score 160 based on a combination of assessment feedback 152 and structured environmental data, this score may incorporated into the safety analysis report 164. Processor 108 may utilizes it as a quantitative metric to adjust the compliance ratings assigned to various parts of the facility. The aggregation algorithm, as discussed above, may leverage this score when evaluating specific environmental attributes—such as material types, fixture locations, or building layouts—by correlating them with applicable safety regulations determined by the geographic ML model 124 and the jurisdiction classifier 128.

Still referring to FIG. 1A, the assessment score 160 may be integrated into the discrepancy detection module 140. If the score indicates a deviation from expected standards, Processor 108 may flag these areas as potential compliance issues, adding the necessary details into the final structured report. The score may not only influence whether a discrepancy is flagged but also how the discrepancy is prioritized within the report, with higher discrepancies being emphasized based on their associated safety risks. A report structuring sub-algorithm may ensure that areas with lower assessment scores 160 (indicating poor compliance) are placed in higher-priority sections of the report, such as "Critical Safety Risks." The assessment score 160 may also be integrated into the heatmap visualization within the safety analysis report. Once Processor 108 calculates the compliance score for each cell in the facility's grid-based layout, it may adjust the heatmap color coding to reflect the assessment score 160's impact on the compliance status. For example, if a low assessment score 160 is associated with a specific room or section of the facility, the heatmap may change the corresponding cell's color to red, indicating critical non-compliance. Conversely, if a high assessment score 160 is achieved, the color of the cell may change to green, signaling full compliance. This dynamic adjustment may be handled through a greedy algorithm that prioritizes the most critical changes in real time, ensuring that the heatmap always reflects the latest compliance status as determined by the assessment score 160.

Still referring to FIG. 1A, the assessment score 160 may be further integrated into the simulation module that processor 108 uses to evaluate potential changes to the facility or predict outcomes based on hypothetical scenarios. During the simulation process, the score may be utilized as a key metric to determine the effectiveness of various safety interventions. For instance, if the simulation module proposes a change to the material used in a patient room, the system may recalculate the assessment score 160 for that room based on the new material specifications, comparing the score to the safety regulations applicable to that jurisdiction. This recalculated score may then be fed back into the discrepancy detection module, which analyzes whether the proposed changes improve or worsen the facility's compliance status. In addition, the simulation module may incorporate machine learning techniques to predict the future assessment score 160 based on patterns observed in the historical data. By running multiple iterations of the simulation, Processor 108 can generate an optimized assessment score 160 that reflects the best possible outcome for the facility, factoring in both the environmental data and regulatory requirements. This score may then be used to inform decision-making, guiding facility managers on the most effective interventions to ensure full compliance and safety.

Figure 1B:
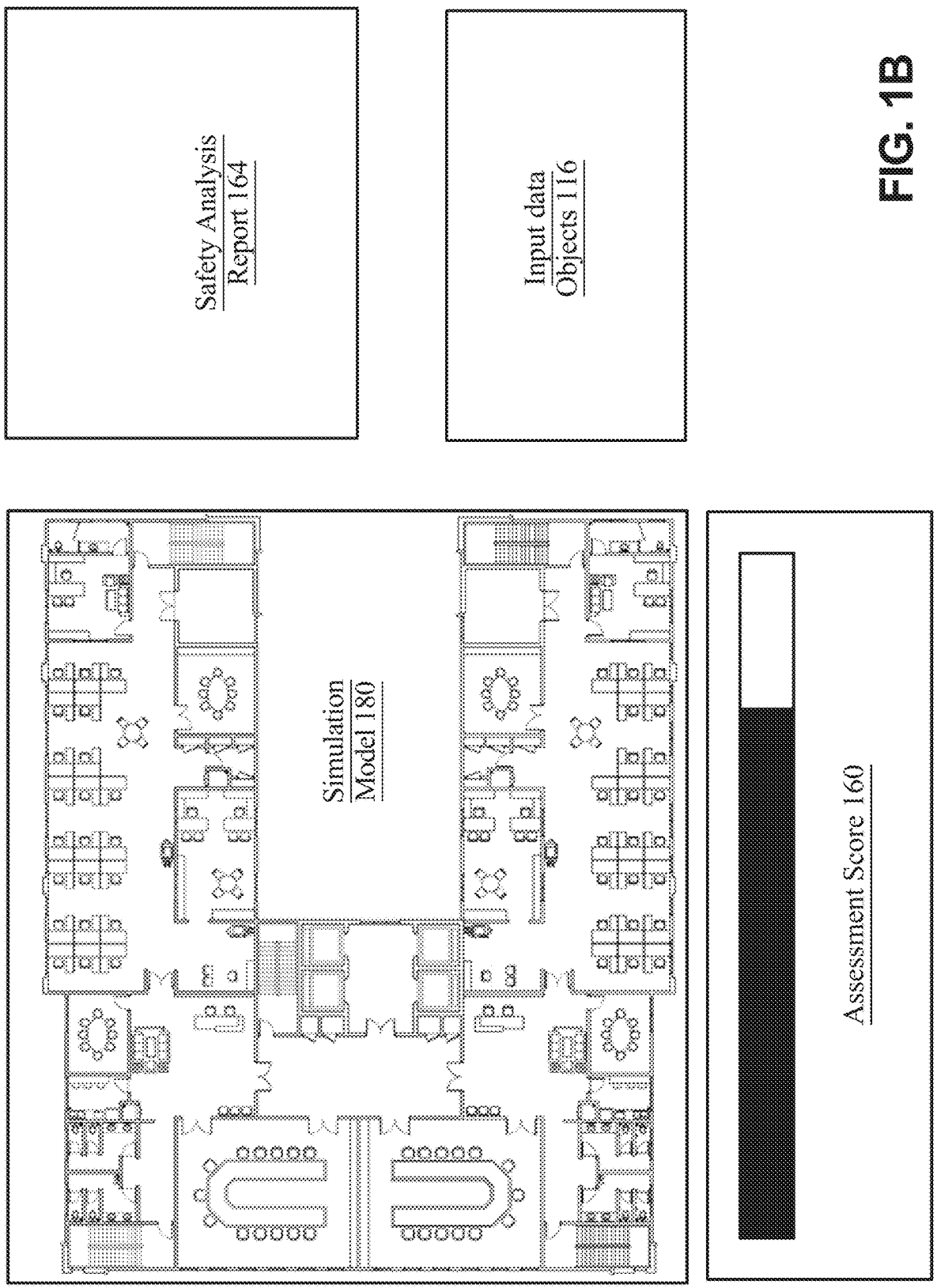
FIG. 1B is an exemplary view of a GUI display of a simulation module of the apparatus.

Referring now to FIG. 1B, an exemplary view of GUI 168 display of simulation module 176 of the apparatus 100. A display of simulation model 176 may include displaying assessment score 160 and safety analysis report 164. Both of which may be recalculated or regenerated based on updated data objects 116. Similarly, the simulation model 180 may be regenerated based on updated input data objects as described above.

Figure 2:
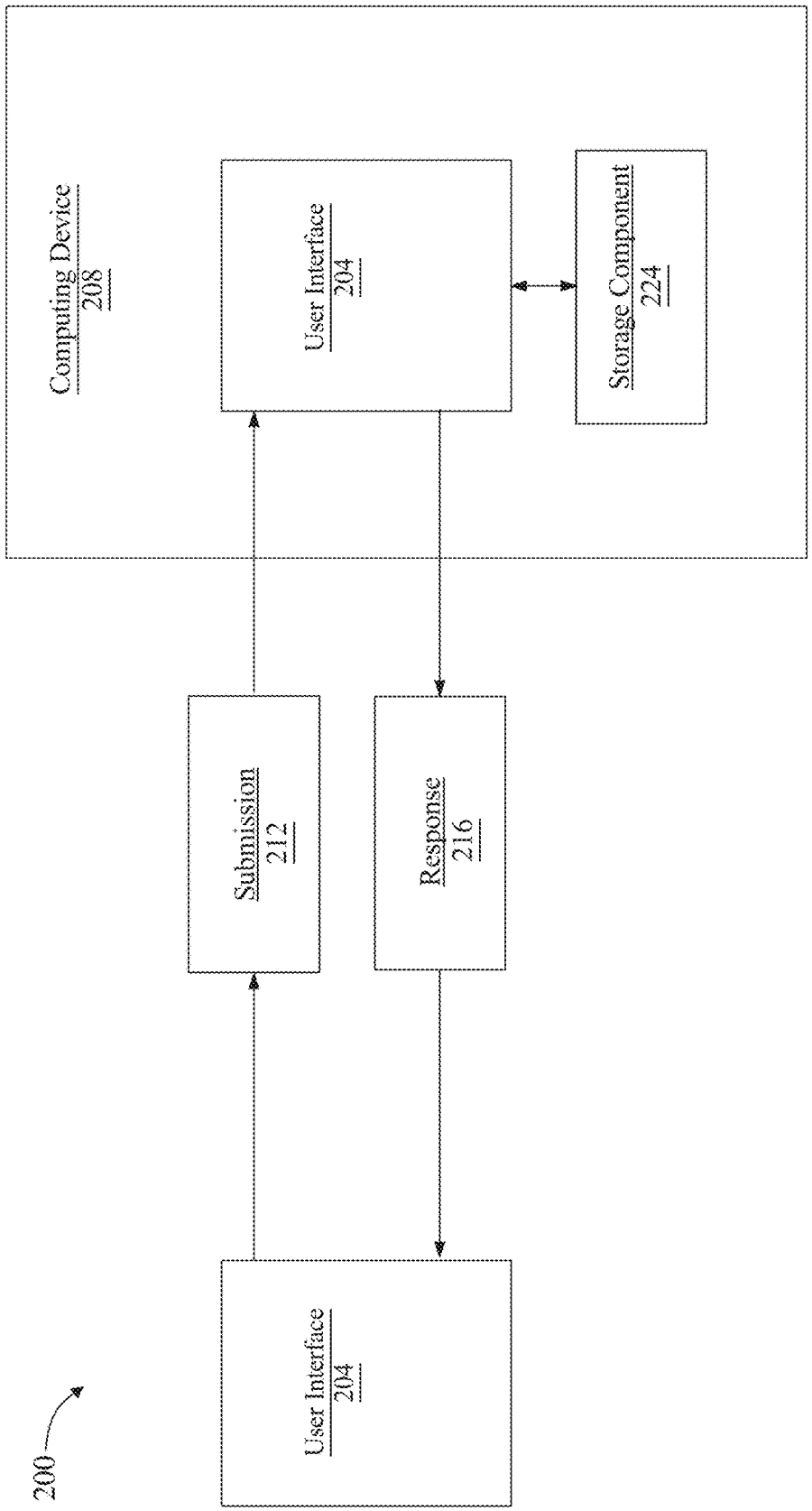
FIG. 2 is a block diagram of exemplary embodiment of a chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively, or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively, or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 104 as an input to another function, for example without limitation at least a feature or at least a preference input.

Figure 3:
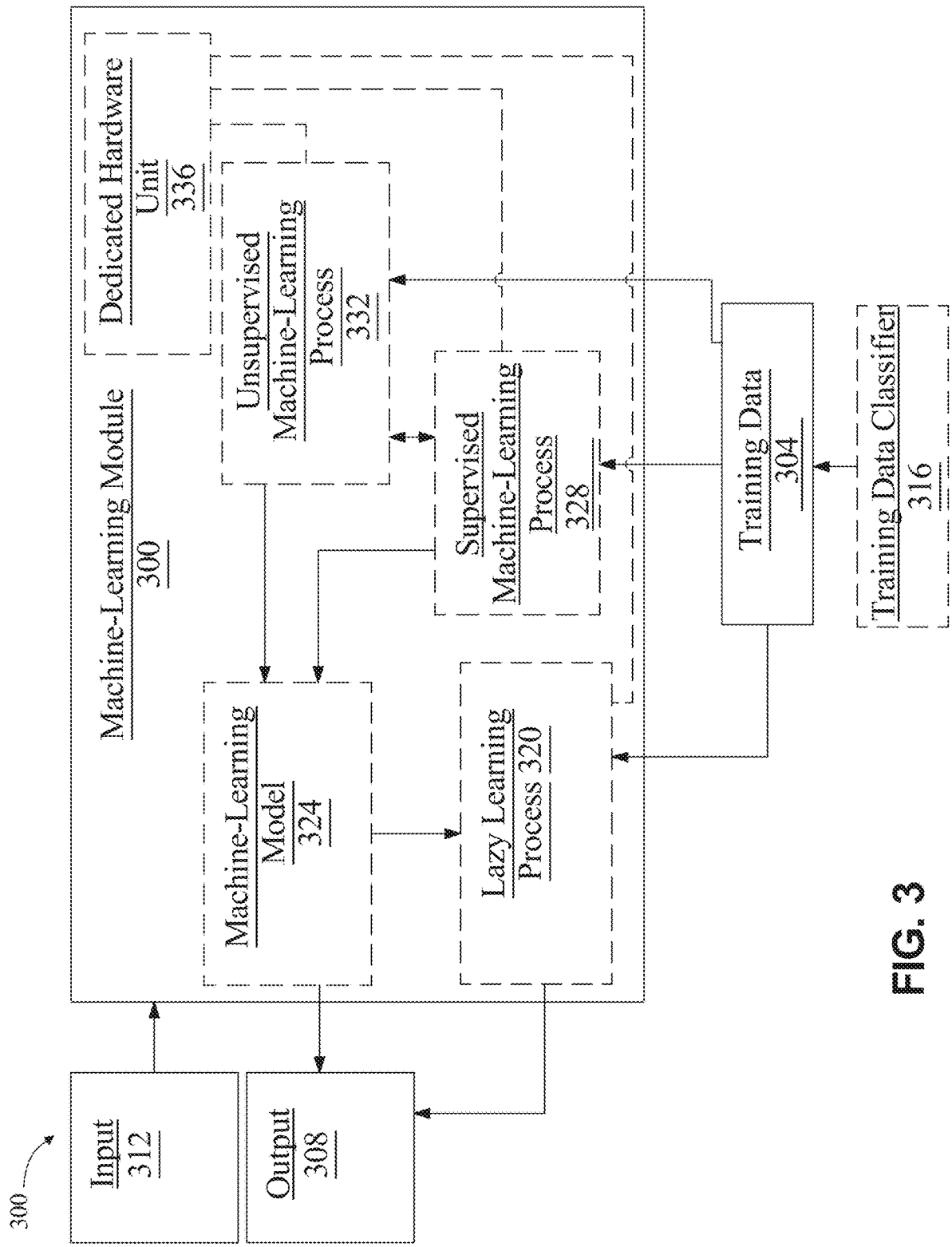
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to geographic regions, compliance roles, job categories, or user interaction patterns, and/or other analyzed items such as a cohort of users who frequently engage with safety training modules within a specific timeframe, and/or phenomena related to patterns of interaction during compliance training for medical professionals in urban versus rural locations.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{min}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
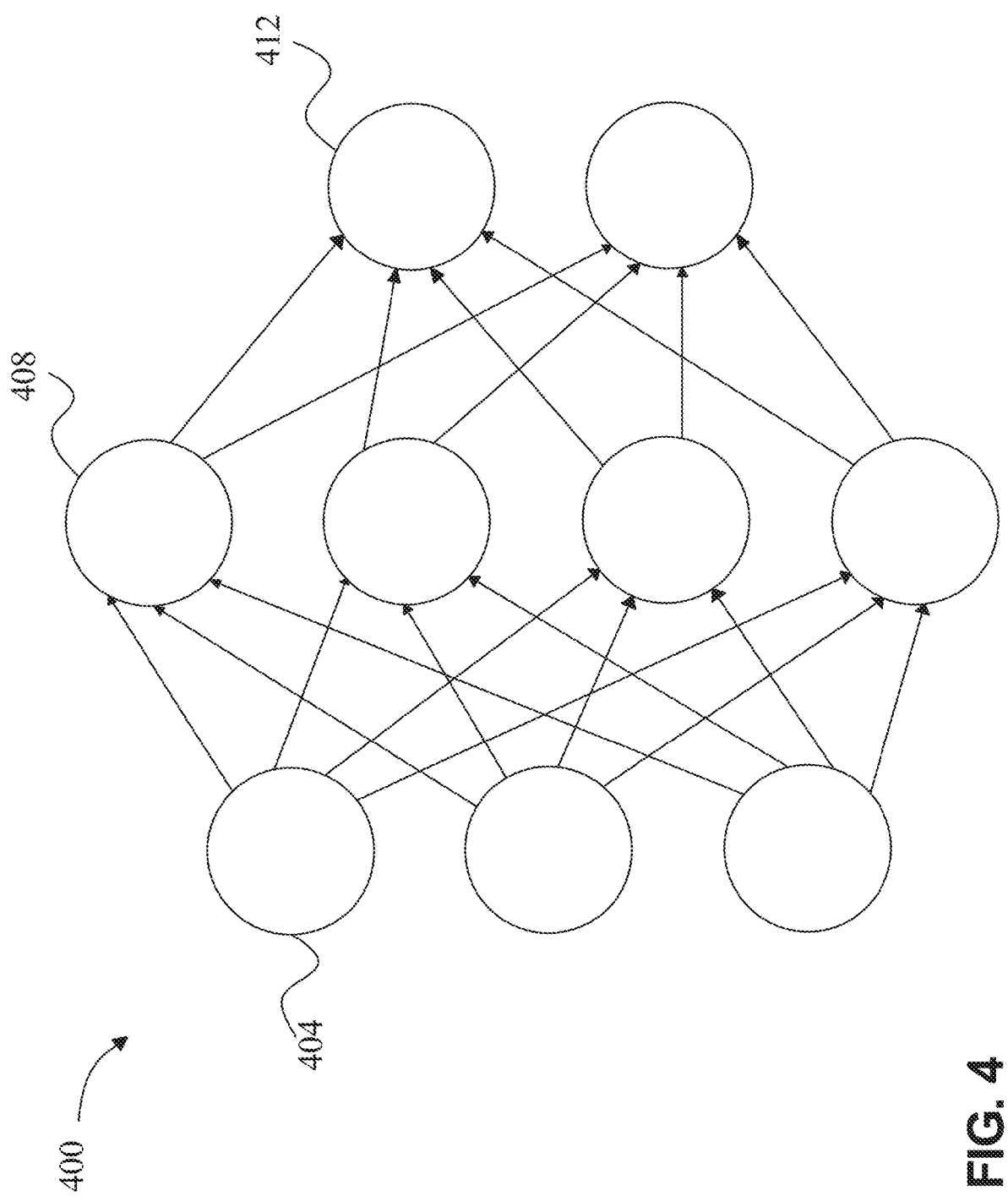
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
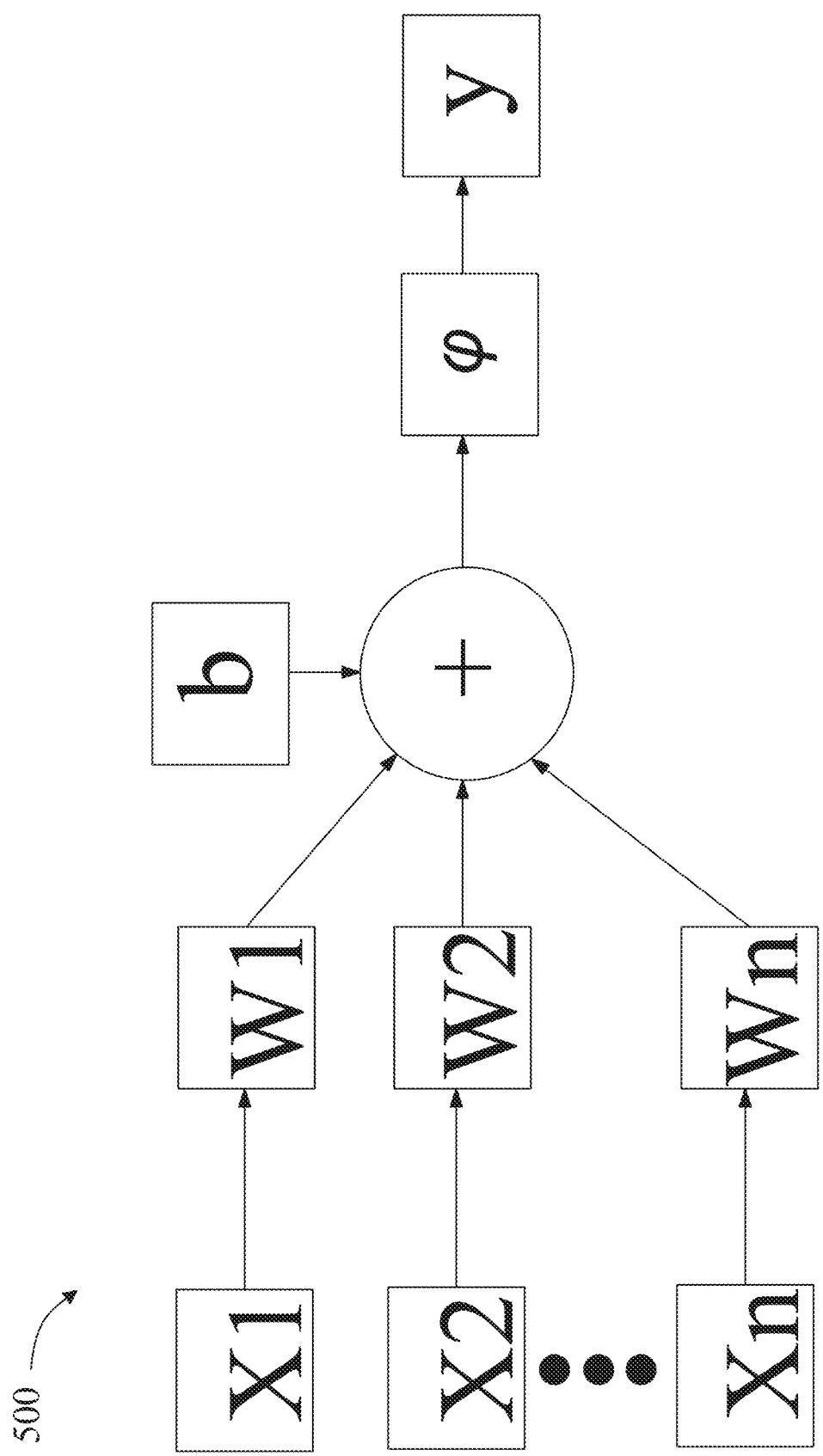
FIG. 5 is a block diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
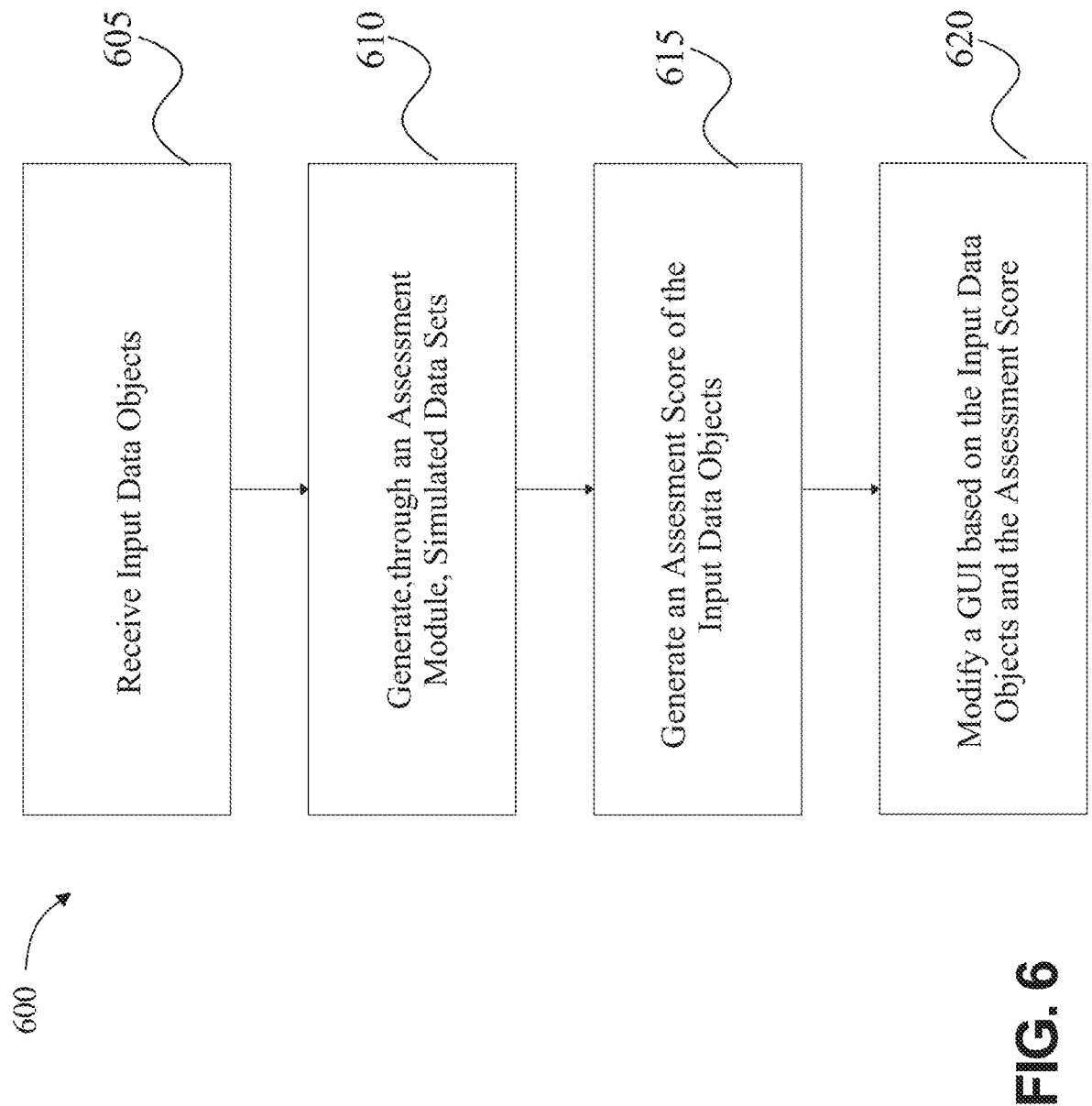
FIG. 6 is an exemplary flow chart of a method for displaying and modifying assessment data through a graphical user interface (GUI)

Now referring to FIG. 6 an exemplary flow chart of a method 600 for displaying and modifying assessment data through a graphical user interface is illustrated. At step 605, method 600 includes receiving, by a computing device, input data objects. This may include methods as disclosed in FIGS. 1-5. At step 610, method 600 generating, by the computing device, through an assessment module, simulated assessment data sets. This may include methods as disclosed in FIGS. 1-5. At step 615, method 600 includes generating an assessment score of the input data as a function of a machine-learning algorithm. At step 620, method 600 includes modifying, by the computing device, a GUI based on the input data objects and the assessment score. This may include methods as disclosed in FIGS. 1-5. The GUI modification includes automatically generating context-sensitive command inputs that trigger analysis routines within the GUI based on at least a geographic location received from the input data objects. The GUI modification includes reconfiguring the GUI to adjust a display hierarchy of interactive elements based on the assessment score.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
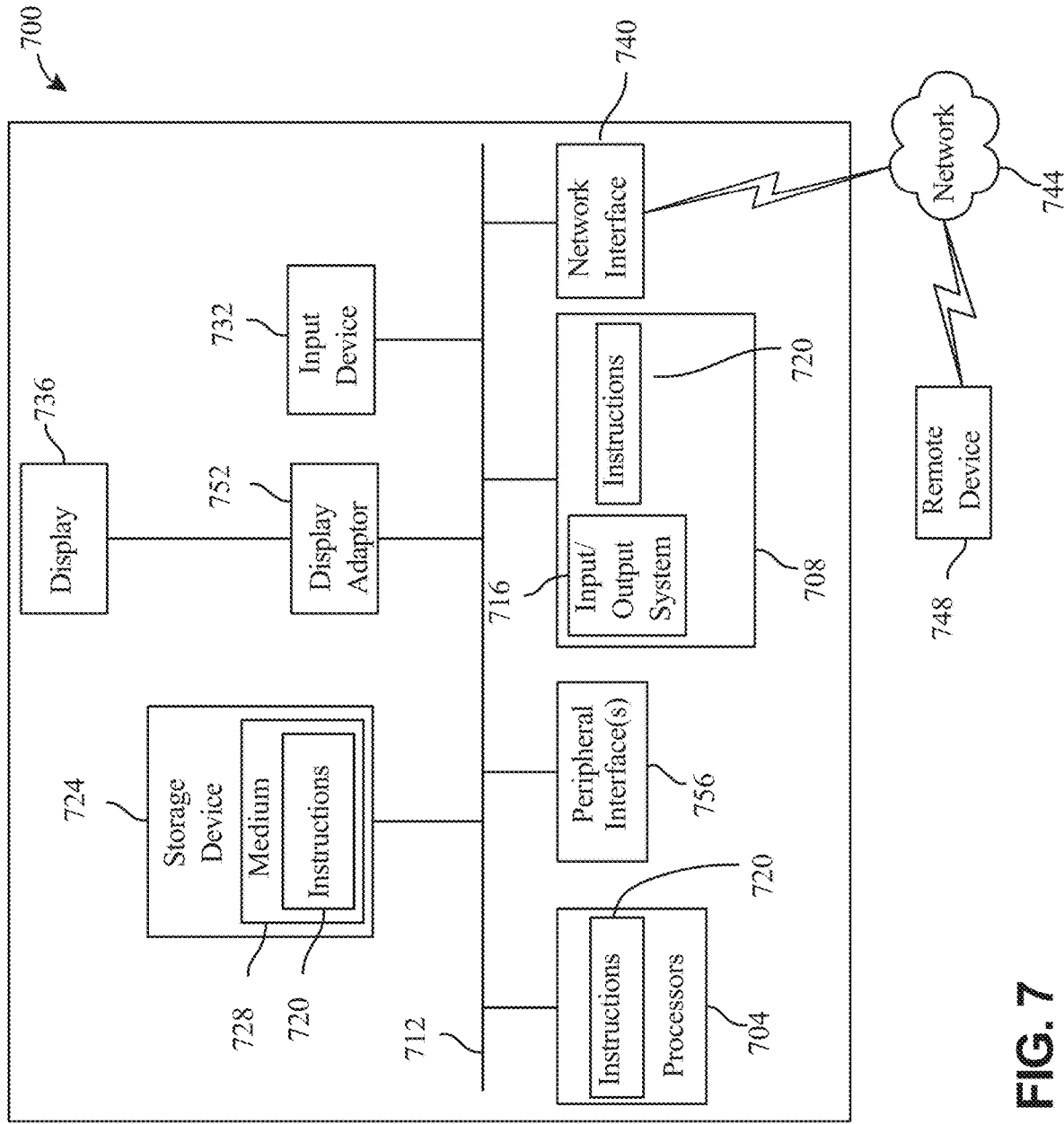
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for displaying and modifying assessment data through a graphical user interface (GUI), the method comprising:
   receiving, by a computing device, input data objects;
   generating, by the computing device, through an assessment module, simulated assessment data sets;
   generating, by the computing device, an assessment score of the input data objects and simulated assessment data sets as a function of a machine-learning algorithm; and
   modifying, by the computing device, a GUI based on the input data objects and the assessment score, wherein modifying the GUI comprises:
      automatically generating context-sensitive command inputs that trigger analysis routines within the GUI based on at least a geographic location received from the input data objects;
      reconfiguring the GUI to adjust a display hierarchy of interactive elements based on the assessment score;
      evaluating, using a rule-based algorithm, compliance associated with the input data objects;
      training a machine learning model in accordance with at least one of: historical data and compliance data;
      predicting, using the trained machine learning model, a compliance outcome associated with the input data objects; initiating a simulation module configured to run multiple hypothetical modification scenarios associated with the input data objects, predict assessment scores for each scenario using the machine learning model, and iteratively identify facility modifications that maximize the assessment score;

filtering, using an autoencoder comprising an unsupervised neural network using at least one of: dimensionality reduction and denoising, the input data objects;
compressing, using an encoder associated with the autoencoder, the input data objects;
reconstructing, using a decoder associated with the autoencoder, the input data objects from the compressed input data objects;
wherein the GUI updates to present an optimized compliance outcome and
configures a display device, using the reconfigured GUI to initiate the simulation module.

2. The method of claim 1, wherein receiving the input data objects comprises employing a machine vision system configured to extract visual inputs from image data of an environment from the input data objects.

3. The method of claim 2, further comprising:
classifying the visual inputs; and
converting the visual inputs into structured environmental data for further processing by the assessment module.

4. The method of claim 1, wherein receiving the input data objects comprises implementing Application Programming Interfaces (APIs) configured to:
send a request to an external endpoint based on a geographic location of a facility; and
obtain structured data from third-party platforms for further processing by the assessment module.

5. The method of claim 1, wherein the at least a processor is further configured to implement a geographical mapping module configured to:
receive the input data objects;
employ a geospatial analysis algorithm to map a facility's location based on the input data objects;
classifying the facility location to regulatory requirements; and
output regulatory requirements based on the facility's location.

6. The method of claim 1, wherein initiating a simulation comprises employing a grid-based layout algorithm to segment a facility into specific areas where modifications are to be modeled.

7. The method of claim 1, further comprising recalculating the assessment score based on a modification to the simulation received through user input.

8. The method of claim 1, wherein the GUI is further configured to display a heatmap using color-coded indicators to represent areas of compliance and non-compliance within a facility based on at least the assessment score, wherein generating the heatmap comprises:
processing the input data objects to identify environmental data;
calculating a plurality of compliance scored based on the environmental data; and
employing a grid-based layout algorithm to map a layout of the facility layout into a structured grid format, wherein each cell in the grid is assigned a compliance score.

9. The method of claim 1, wherein modifying the GUI based on the input data objects comprises employing an adaptive layout engine configured to automatically scale and adjust the GUI based on a display device such that the GUI is responsive across heterogeneous platforms.

10. A method as claimed in claim 1, further comprising:
imposing, by a constraint satisfaction algorithm operably communicative with the at least a processor, at least one limit associated with the input data objects.

11. An apparatus comprising a graphical user interface (GUI) for displaying and modifying assessment data, the apparatus comprising:
at least a processor; and
a memory configuring the at least a processor to:
receive input data objects;
generate, through an assessment module, simulated assessment data sets;
generate an assessment score of the input data objects and simulated assessment data sets as a function of a machine-learning algorithm; and
modify a GUI based on the input data objects and the assessment score, wherein modifying the GUI comprises:
automatically generating context-sensitive command inputs that trigger analysis routines within the GUI based on at least a geographic location received from the input data objects;
reconfiguring the GUI to adjust a display hierarchy of interactive elements based on the assessment score;
evaluating, using a rule-based algorithm, compliance associated with the input data objects;
training a machine learning model in accordance with at least one of: historical data and compliance data;
predicting, using the trained machine learning model, a compliance outcome associated with the input data objects; initiating a simulation module configured to run multiple hypothetical modification scenarios associated with the input data objects, predict assessment scores for each scenario using the machine learning model, and iteratively identify facility modifications that maximize the assessment score;
filtering, using an autoencoder comprising an unsupervised neural network using at least one of: dimensionality reduction and denoising, the input data objects;
compressing, using an encoder associated with the autoencoder, the input data objects;
reconstructing, using a decoder associated with the autoencoder, the input data objects from the compressed input data objects;
wherein the GUI updates to present an optimized compliance outcome and
configures a display device, using the reconfigured GUI to initiate the simulation module.

12. The apparatus of claim 11, wherein receiving the input data objects comprises employing a machine vision system configured to extract visual inputs from image data of an environment from the input data objects.

13. The apparatus of claim 12, wherein the at least a processor is further configured to:
classify the visual inputs; and
convert the visual inputs into structured environmental data for further processing by the assessment module.

14. The apparatus of claim 11, wherein receiving the input data objects comprises implementing Application Programming Interfaces (APIs) configured to:
send a request to an external endpoint based on a geographic location of a facility; and
obtain structured data from third-party platforms for further processing by the assessment module.

15. The apparatus of claim 11, wherein the at least a processor is further configured to implement a geographical mapping module configured to:
receive the input data objects;
employ a geospatial analysis algorithm to map a facility's location based on the input data objects;

classifying the facility location to regulatory requirements; and output regulatory requirements based on the facility's location.

16. The apparatus of claim 11, wherein initiating a simulation comprises employing a grid-based layout algorithm to segment a facility into specific areas where modifications are to be modeled.

17. The apparatus of claim 11, further comprising recalculating the assessment score based on a modification to the simulation received through user input.

18. The apparatus of claim 11, wherein the GUI is further configured to display a heatmap using color-coded indicators to represent areas of compliance and non-compliance within a facility based on at least the assessment score, wherein generating the heatmap comprises:

processing the input data objects to identify environmental data;

calculating a plurality of compliance scored based on the environmental data; and employing a grid-based layout algorithm to map a layout of the facility layout into a structured grid format, wherein each cell in the grid is assigned a compliance score.

19. The apparatus of claim 11, wherein modifying the GUI based on the input data objects comprises employing an adaptive layout engine configured to automatically scale and adjust the GUI based on a display device such that the GUI is responsive across heterogeneous platforms.

20. An apparatus as claimed in claim 11, further comprising:

a constraint satisfaction algorithm, operably communicative with the at least a processor, for imposing at least one limit associated with the input data objects.

* * * * *